(12) United States Patent
Seo et al.

(10) Patent No.: US 10,002,462 B2
(45) Date of Patent: Jun. 19, 2018

(54) INFORMATION PROVIDING METHOD AND INFORMATION PROVIDING VEHICLE THEREFOR

(71) Applicant: SAMSUNG ELECTRONICS CO., LTD., Suwon-si (KR)

(72) Inventors: Joon-kyu Seo, Suwon-si (KR); Kyung-a Kang, Seoul (KR); Chang-soo Lee, Seosan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 371 days.

(21) Appl. No.: 14/015,609

(22) Filed: Aug. 30, 2013

(65) Prior Publication Data

US 2014/0063064 A1    Mar. 6, 2014

(30) Foreign Application Priority Data

Aug. 31, 2012   (KR) .................. 10-2012-0096705

(51) Int. Cl.
*B60Q 1/00*    (2006.01)
*G06T 19/00*   (2011.01)
(Continued)

(52) U.S. Cl.
CPC .......... *G06T 19/006* (2013.01); *G01C 21/365* (2013.01); *G08G 1/0962* (2013.01);
(Continued)

(58) Field of Classification Search
None
See application file for complete search history.

(56) References Cited

U.S. PATENT DOCUMENTS

| 6,091,323 A | * | 7/2000 | Kawai | ................. | B60Q 9/008 |
| | | | | | 340/435 |
| 6,447,132 B1 | * | 9/2002 | Harter, Jr. | .............. | G01D 11/28 |
| | | | | | 345/102 |

(Continued)

FOREIGN PATENT DOCUMENTS

| EP | 1510849 A1 | 3/2005 |
| EP | 1632923 A2 | 3/2006 |

(Continued)

OTHER PUBLICATIONS

International Search Report dated Nov. 27, 2013, issued by the International Searching Authority in counterpart International Application No. PCT/KR2013/007747.

(Continued)

*Primary Examiner* — David H Chu
(74) *Attorney, Agent, or Firm* — Sughrue Mion, PLLC

(57) ABSTRACT

A method of providing information about a predetermined external vehicle on a transparent display of an information providing vehicle, the method including: acquiring status information of the external vehicle; determining a display mode for displaying an object corresponding to the external vehicle based on the acquired status information; and displaying the object corresponding to the external vehicle on the transparent display in the determined display mode, wherein the display mode may include an augmented reality mode displaying an image obtained by overlaying a virtual image on an actual image of the external vehicle that is observed through the transparent display, and a map mode displaying the object corresponding to the external vehicle after mapping the object to a map.

41 Claims, 19 Drawing Sheets

(51) Int. Cl.
- *G08G 1/0962* (2006.01)
- *G08G 1/0967* (2006.01)
- *G08G 1/16* (2006.01)
- *G01C 21/36* (2006.01)
- *G02B 27/01* (2006.01)

(52) U.S. Cl.
CPC ..... *G08G 1/0967* (2013.01); *G08G 1/096716* (2013.01); *G08G 1/096741* (2013.01); *G08G 1/096775* (2013.01); *G08G 1/163* (2013.01); *G08G 1/166* (2013.01); *G02B 2027/0141* (2013.01)

(56) References Cited

U.S. PATENT DOCUMENTS

| | | | |
|---|---|---|---|
| 6,864,927 B1* | 3/2005 | Cathey | G02B 27/01 349/11 |
| 6,996,469 B2 | 2/2006 | Lau et al. | |
| 7,982,959 B1* | 7/2011 | Lvovskiy | G02B 27/01 348/115 |
| 8,155,826 B2* | 4/2012 | Nakamura | G01C 21/26 701/517 |
| 8,487,786 B1* | 7/2013 | Hussey | G08G 5/0021 340/955 |
| 8,536,994 B2* | 9/2013 | Hada | B60Q 1/525 340/435 |
| 8,681,073 B1* | 3/2014 | Robbins | H04N 21/4318 345/7 |
| 2001/0044697 A1* | 11/2001 | Kageyama | B60W 40/04 701/301 |
| 2002/0135468 A1* | 9/2002 | Bos | B60N 2/002 340/436 |
| 2005/0065711 A1* | 3/2005 | Dahlgren | G01C 21/26 701/117 |
| 2005/0107945 A1* | 5/2005 | Hiller | G01C 21/3415 701/533 |
| 2005/0149250 A1 | 7/2005 | Isaac | |
| 2006/0055525 A1* | 3/2006 | Kubota | G08G 1/0962 340/461 |
| 2006/0220923 A1* | 10/2006 | Tanizaki | G09B 29/10 340/995.1 |
| 2006/0267747 A1* | 11/2006 | Kondo | B60Q 9/008 340/435 |
| 2007/0027614 A1* | 2/2007 | Reeser | G01C 21/26 701/420 |
| 2007/0050133 A1* | 3/2007 | Yoshikawa | G01C 21/3658 701/437 |
| 2007/0124044 A1* | 5/2007 | Ayoub | G06F 21/10 701/36 |
| 2007/0146164 A1* | 6/2007 | Schmid | G08G 1/161 340/932.2 |
| 2007/0200694 A1* | 8/2007 | Mortara | B60K 35/00 340/461 |
| 2007/0233363 A1* | 10/2007 | Rosario | G01C 21/26 701/532 |
| 2008/0129592 A1* | 6/2008 | Wu | G01S 19/35 342/357.23 |
| 2008/0150786 A1* | 6/2008 | Breed | B60N 2/2863 342/53 |
| 2008/0154499 A1* | 6/2008 | Tanaka | G01C 21/362 701/431 |
| 2008/0186210 A1 | 8/2008 | Tseng | |
| 2009/0012709 A1* | 1/2009 | Miyazaki | G01C 21/26 701/514 |
| 2010/0020169 A1 | 1/2010 | Jang et al. | |
| 2010/0045704 A1 | 2/2010 | Kim | |
| 2010/0063717 A1 | 3/2010 | Proefke et al. | |
| 2010/0066832 A1* | 3/2010 | Nagahara | G02B 7/1822 348/148 |
| 2010/0217483 A1* | 8/2010 | Matsuno | G08G 1/165 701/36 |
| 2010/0292886 A1* | 11/2010 | Szczerba | G01C 21/365 701/31.4 |
| 2011/0248842 A1 | 10/2011 | Yang et al. | |
| 2012/0078509 A1* | 3/2012 | Choi | G01C 21/3461 701/423 |
| 2012/0093357 A1 | 4/2012 | Seder et al. | |
| 2012/0116670 A1* | 5/2012 | Rosekrans | G01C 21/3682 701/426 |
| 2012/0154441 A1 | 6/2012 | Kim | |
| 2012/0158287 A1* | 6/2012 | Altamura | G01C 21/20 701/412 |
| 2012/0169514 A1* | 7/2012 | Imanaga | G01C 21/3697 340/905 |
| 2012/0249589 A1* | 10/2012 | Gassner | G02B 27/01 345/633 |
| 2012/0268295 A1* | 10/2012 | Yuse | G01C 21/3691 340/905 |

FOREIGN PATENT DOCUMENTS

| | | | |
|---|---|---|---|
| JP | 200629911 A | | 2/2006 |
| JP | 2011119902 A | * | 6/2011 |
| KR | 10-2007-0045373 A | | 5/2007 |
| KR | 1020100012578 A | | 2/2010 |
| KR | 1020120066472 A | | 6/2012 |
| KR | 1020120067854 A | | 6/2012 |

OTHER PUBLICATIONS

Written Opinion dated Nov. 27, 2013, issued by the International Searching Authority in counterpart International Application No. PCT/KR2013/007747.
Communication dated Jan. 8, 2014, issued by the European Patent Office is counterpart European Application No. 13182197.7.
Papadimitratos, et al.; "Architecture for Secure and Private Vehicular Communications", Telecommunications, 7th International Conference on ITS, Jun. 1, 2007, pp. 1-6.
"Intelligent Transport Systems (ITS); Security; Stage 3 Mapping for IEEE 1609.2", ETSI Draft, European Telecommunications Standards Institute, Sep. 26, 2010, pp. 1-27.
Communication dated May 13, 2014, issued by the European Patent Office in counterpart European Application No. 13182197.7.

* cited by examiner

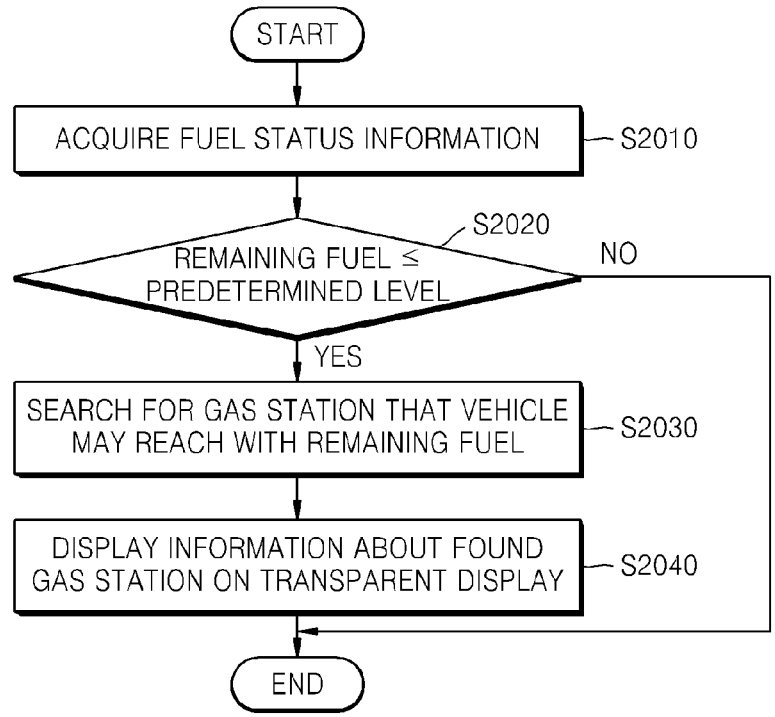
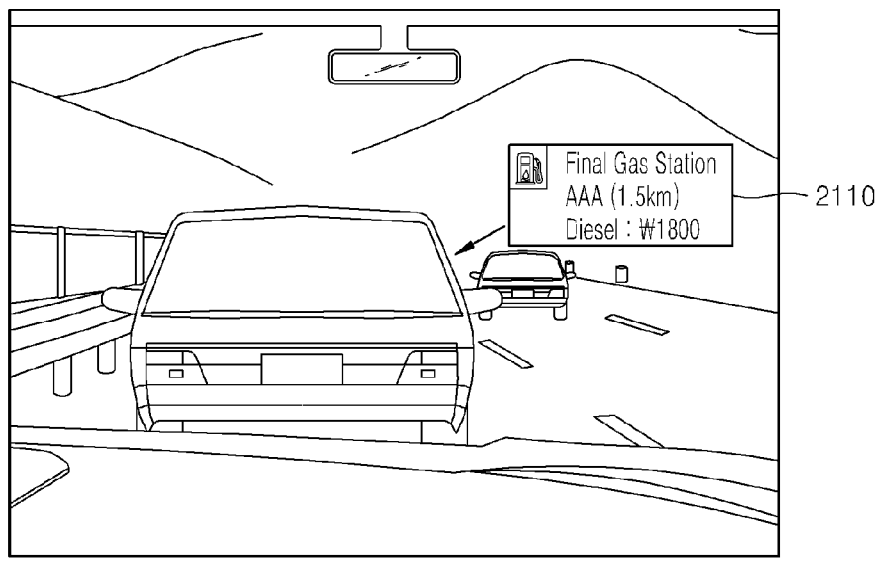

INFORMATION PROVIDING METHOD AND INFORMATION PROVIDING VEHICLE THEREFOR

CROSS-REFERENCE TO RELATED PATENT APPLICATION

This application claims priority from Korean Patent Application No. 10-2012-0096705, filed on Aug. 31, 2012, in the Korean Intellectual Property Office, the disclosure of which is incorporated herein in its entirety by reference.

BACKGROUND

1. Field

Methods and apparatuses consistent with the exemplary embodiments relate to an information providing method which displays images corresponding to information about an environment inside or outside a vehicle on a transparent display in the vehicle, and an information providing vehicle therefor.

2. Description of the Related Art

Research related to vehicles in the past concentrated on improving driving speed that is an inherent performance characteristic of vehicles and fuel efficiency. However, recent researches into vehicles have given a lot of weight to improving driver convenience and safety. Also, safety components such as seat belts, airbags, shock absorbing bodies, etc. are widely distributed, and impact tests are widely performed so that safety consciousness has improved. However, these safety components are passive ways for reducing damage after traffic accidents occur.

Therefore, an information providing system that enables a driver to clearly recognize necessary information while driving or to obtain information about the environment inside and outside the vehicle and that prevents accidents from occurring due to negligence of the driver is necessary.

SUMMARY

The exemplary embodiments provide an information providing method which provides a driver with useful information by displaying information about an environment inside and outside a vehicle, which is collected by the vehicle, on a transparent display in the vehicle, and an information providing vehicle therefor.

The exemplary embodiments also provides an information providing method which allows a driver to recognize environmental information rapidly without having to turn his/her eyes away by displaying information collected from non-visible ranges of the driver on the transparent display, and an information providing vehicle therefor.

According to an aspect of the exemplary embodiment, there is provided a method of providing information about a predetermined external vehicle on a transparent display of a vehicle, the method including: acquiring status information of the external vehicle; determining a display mode for displaying an object corresponding to the external vehicle based on the acquired status information; and displaying the object corresponding to the external vehicle on the transparent display in the determined display mode, wherein the display mode may include an augmented reality mode displaying an image obtained by overlaying a virtual image on an actual image of the external vehicle that is observed through the transparent display, and a map mode displaying the object corresponding to the external vehicle after mapping the object to a map.

The status information of the external vehicle may include at least one of location information of the external vehicle, route information, driving speed information, stoppage status information, used traffic lane information, and turning light manipulation status information.

The acquiring of the status information of the external vehicle may include receiving the status information from the external vehicle via a predetermined network.

The determining of the display mode may be performed based on a distance between the vehicle and the external vehicle.

The determining of the display mode may include determining the augmented reality mode as the display mode when the distance between the vehicle and the external vehicle is less than a predetermined distance, and determining the map mode as the display mode when the distance between the vehicle and the external vehicle is equal to or greater than the predetermined distance.

The predetermined distance may include a visible distance, in which a driver of the vehicle may see the external vehicle with his/her naked eyes.

The displaying of the object corresponding to the external vehicle may include: when the augmented reality mode is determined as the display mode, recognizing the external vehicle by using a camera based on at least one of outer appearance information and plate number information of the external vehicle; and displaying the object corresponding to the external vehicle on the transparent display so that the object corresponding to the external vehicle may overlap the actual image of the external vehicle.

The recognizing of the external vehicle may include: selecting a plurality of candidate vehicles that are recognized through the camera based on at least one of the outer appearance information and the plate number information; and recognizing the external vehicle from among the plurality of candidate vehicles based on eye information of the driver or input information of the driver.

The displaying of the object may include displaying at least one of route information, driving speed information, stoppage status information, used traffic lane information, and turning light manipulation status information of the external vehicle.

The status information of the external vehicle may include relative status information of the external vehicle based on the information providing vehicle. The status information of the external vehicle may include at least one of relative speed, relative location, and relative distance information.

The displaying of the object may include displaying the object corresponding to the external vehicle on the transparent display after mapping the object to the map, when the map mode is determined as the display mode.

The displaying of the object after mapping may include changing a scale of the map based on a distance between the vehicle and the external vehicle.

The displaying of the object may include changing at least one of a size, a displaying interval, and a color of the object corresponding to the external vehicle based on a distance between the vehicle and the external vehicle.

The displaying of the object corresponding to the external vehicle may include: recognizing a location of the driver's eyes; and adjusting a display location or an angle of the object corresponding to the external vehicle, based on the location of the driver's eyes.

The external vehicle may include a vehicle having a cross-certificate for exchanging the location information with the vehicle.

The method may further include: receiving identification information of the external vehicle from the driver; requesting the external vehicle to exchange location information based on the identification information of the external vehicle; and receiving an acceptance message with respect to the request for exchanging the location information from the external vehicle.

The method may further include acquiring illuminance information from outside of the vehicle or illuminance information according to a direction of the driver's eyes.

The method may further include adjusting the transparency of the transparent display based on the illuminance information outside of the vehicle or the illuminance information obtained according to the direction of the driver's eyes.

The method may further include changing a color of the object corresponding to the external vehicle and displaying the object, based on the illuminance information outside the vehicle or the illuminance information obtained according to the direction of the driver's eyes.

The method may further include receiving and displaying information provided by a navigation device of the external vehicle from the external vehicle.

The method may further include: when a remaining fuel level of the vehicle is equal to or less than a predetermined level, searching for a gas station that the vehicle may reach with the remaining fuel; and displaying information about a found gas station on the transparent display.

The displaying of the information about the found gas station may include displaying an object corresponding to the gas station and overlapping the object with an actual image of the found gas station, when the found gas station is recognized by the camera.

The method may further include: acquiring information regarding the occurrence of a defect with regard to the vehicle; searching for a car repair shop where a defective part may be repaired, based on the defect occurrence information; and displaying information about a found car repair shop on the transparent display.

The method may further include displaying an image corresponding to at least one of information about a location where an accident occurs, information regarding the time that an accident occurred, information regarding the traffic lane where an accident occurred, and detour information on the transparent display.

According to another aspect of the exemplary embodiment, there is provided an information providing vehicle for providing information about a predetermined external vehicle on a transparent display, the information providing vehicle including: a status recognition device configured to acquire status information of the external vehicle; a controller configured to determine a display mode configured to display an object corresponding to the external vehicle, based on the acquired status information; a transparent display configured to display the object corresponding to the external vehicle in the determined display mode, wherein the display mode may include an augmented reality mode displaying an image obtained by overlaying a virtual image on an actual image of the external vehicle that is observed through the transparent display, and a map mode displaying the object corresponding to the external vehicle after mapping the object to a map.

The status recognition device may receive the status information from the external vehicle via a predetermined network.

The controller may determine the display mode based on a distance between the information providing vehicle and the external vehicle.

The controller may determine the augmented reality mode as the display mode when the distance between the information providing vehicle and the external vehicle is less than a predetermined distance, and determine the map mode as the display mode when the distance between the information providing vehicle and the external vehicle is equal to or greater than the predetermined distance.

The predetermined distance may include a visible distance, in which a driver of the vehicle may see the external vehicle with his/her naked eyes, and the controller may adjust the visible distance based on at least one of weather information, illuminance information, and humidity information.

The status recognition device may recognize the external vehicle through a camera based on at least one of outer appearance information of the external vehicle and plate number information, when the augmented reality mode is determined as the display mode, and the transparent display may display the object corresponding to the external vehicle and overlaps the object with an actual image of the external vehicle.

The status recognition device may select a plurality of candidate vehicles that are recognized through the camera based on at least one of the outer appearance information and the plate number information; and recognize the external vehicle from among the plurality of candidate vehicles based on eye information of the driver or input information of the driver.

The transparent display may display at least one of route information, driving speed information, stoppage status information, used traffic lane information, and turning light manipulation status information of the external vehicle.

The transparent display may display the object corresponding to the external vehicle on the transparent display after mapping the object to the map, when the map mode is determined as the display mode.

The controller may change a scale of the map based on a distance between the information providing vehicle and the external vehicle.

The transparent display may change at least one of a size, a displaying interval, and a color of the object corresponding to the external vehicle based on a distance between the information providing vehicle and the external vehicle.

The status recognition device may recognize a location of the driver's eyes, and the transparent display may adjust a display location or an angle of the object corresponding to the external vehicle, based on the location of the driver's eyes.

The status recognition device may include: a user input for receiving identification information of the external vehicle from the driver; and a communication device requesting the external vehicle to exchange location information with the information providing vehicle, and receiving an acceptance message with respect to the request for exchanging the location information from the external vehicle.

The status recognition device may acquire illuminance information outside the information providing vehicle or illuminance information according to a direction of the driver's eyes.

The controller may adjust transparency of the transparent display based on the illuminance information outside the information providing vehicle or the illuminance information according to the direction of the driver's eyes.

The transparent display may change a color of the object corresponding to the external vehicle and displays the object, based on the illuminance information outside the information providing vehicle or the illuminance information according to the direction of the driver's eyes.

The transparent display may receive and display information provided by a navigation device of the external vehicle from the external vehicle.

When a remaining fuel level of the vehicle is equal to or less than a predetermined fuel level, the controller may search for a gas station that the vehicle may reach with the remaining fuel, and the transparent display displays information about a found gas station.

The transparent display may display an object corresponding to the found gas station and overlap the object with an actual image of the found gas station, when the found gas station is recognized by the camera.

The status recognition device may acquire information regarding the occurrence of a defect in the vehicle, the controller searches for a car repair shop in which a defective part may be repaired, based on the defect occurrence information, and the transparent display may display information about a found car repair shop.

The transparent display may display an image corresponding to at least one of information about a location where an accident occurs, information regarding the time that the accident occurred, information regarding a traffic lane in which the accident occurred, and detour information on the transparent display.

BRIEF DESCRIPTION OF THE DRAWINGS

The above and other aspects of the exemplary embodiments will become more apparent by describing in detail exemplary embodiments thereof with reference to the attached drawings in which:

FIG. 20 is a flowchart illustrating a method of providing information about a gas station, according to an exemplary embodiment;

FIG. 21 is a diagram showing a screen displaying information about a gas station located at a distance from the driver that makes it invisible to him/her, according to an exemplary embodiment;

DETAILED DESCRIPTION OF EXEMPLARY EMBODIMENTS

Terms used herein will be briefly described, and exemplary embodiments will be described in detail below.

General and widely-used terms have been employed herein, in consideration of functions provided in the exemplary embodiments, and may vary according to an intention of one of ordinary skill in the art, a precedent, or emergence of new technologies. Additionally, in some cases, an applicant may arbitrarily select specific terms, in which case, the applicant will provide the meaning of the terms in the description of the exemplary embodiments. Accordingly, It will be understood that the terms used herein should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

The exemplary embodiments will now be described more fully with reference to the accompanying drawings, in which exemplary embodiments are shown. The exemplary embodiments may, however, be embodied in many different forms and should not be construed as being limited to the exemplary embodiments set forth herein. In the description of the exemplary embodiments, certain detailed explanations of the related art are omitted when it is deemed that they may unnecessarily obscure the essence of the exemplary embodiments. Like numbers refer to like elements throughout the description of the figures. As used herein, the term "and/or" includes any and all combinations of one or more of the associated listed items. Expressions such as "at least one of," when preceding a list of elements, modify the entire list of elements and do not modify the individual elements of the list.

Figure 1:
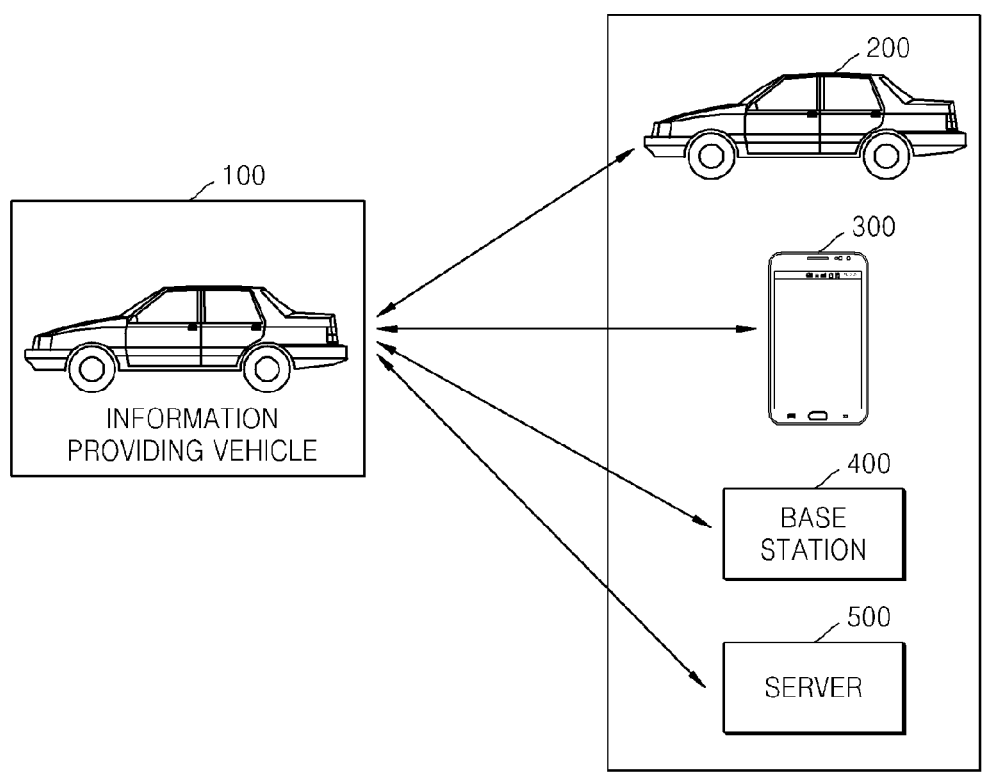
FIG. 1 is a diagram showing an information providing system according to an exemplary embodiment.

FIG. 1 is a diagram showing an information providing system according to an exemplary embodiment.

As shown in FIG. 1, the information providing system according to the present exemplary embodiment may include an information providing vehicle 100, another vehicle 200, a mobile terminal 300, a base station 400, and a server 500.

The information providing vehicle 100 according to the present exemplary embodiment is a vehicle including a transparent display for providing information. The transparent display is an information display apparatus having a transparent screen, on which information is displayed, so that a view behind the screen is projected therethrough. The transparent display is formed of a transparent device, and transparency of the transparent device may be adjusted by controlling a light transmittance of the transparent device or an RGB value of each pixel.

The information providing vehicle 100 may include various types of vehicles. For example, the information providing vehicle 100 may be a small car, a midsize car, a full-size car, or a specialized vehicle, and may include a sedan, a van, a truck, a bus, or a cargo vehicle, but is not limited thereto.

The information providing vehicle 100 according to the present exemplary embodiment may acquire environmental information regarding the vehicle. The environmental information regarding the vehicle may include vehicle information that is regularly detected (for example, velocity of the vehicle, traffic lane, a temperature in the vehicle, humidity of the vehicle, a status of tires, engine status, etc.), information about a driver (information about location of the driver's eyes, drowsiness status information, alcohol level status information, information about mobile terminal usage, etc.), unexpected accidents occurring in the vehicle (for example, generation of defects in the vehicle, lack of fuel, accident occurrence, etc.).

Also, the information providing vehicle 100 according to the present exemplary embodiment may acquire information about the environment outside the vehicle. For example, the information providing vehicle 100 may perform a wired or wireless communication with the another vehicle 200, the mobile terminal 300, the base station 400, and the server 500 to acquire the information about the environment outside the vehicle.

The information about the environment outside the vehicle may be information about events occurring outside the vehicle, for example, information received from external devices (for example, location information of the other vehicle 200, speed of the other vehicle 200, traffic lane of the other vehicle 200, and an indicator light status of the other vehicle 200), background information within a predetermined distance (building information, information about other vehicles, weather information, illumination information), accident information of the other vehicle 200, and traffic condition information.

The other vehicle 200 according to the present exemplary embodiment may provide the information providing vehicle 100 with information via a vehicle to vehicle communication network (for example, IEEE 802.11p WAVE). For example, the other vehicle 200 may transmit driving speed information, stoppage status information, current location information, lane information, accident information, etc. to the information providing vehicle 100. Here, the other vehicle 200 may transmit the information upon receiving a request from the information providing vehicle 100, or may transmit the information within a predetermined period to the information providing vehicle 100.

The mobile terminal 300 may communicate with the information providing vehicle 100 wirelessly. The mobile terminal 300 according to the present exemplary embodiment may exist in the information providing vehicle 100, and may provide the information providing vehicle 100 with the information.

In addition, the information providing vehicle 100 according to the present exemplary embodiment may communicate with the other vehicle 200, a mobile terminal of a driver of the other vehicle 200, the base station 400, and the server 500 via the mobile terminal 300. The mobile terminal 300 according to the present exemplary embodiment may be realized in various types. For example, the mobile terminal 300 may be a mobile phone, a smartphone, a laptop computer, a tablet PC, an electronic book terminal, a digital broadcasting terminal, a personal digital assistant (PDA), a portable multimedia player (PMP), or a navigation device; however, the exemplary embodiments are not limited thereto.

The base station 400 may include a roadside unit (RSU) that is installed on a road side. The base station 400 receives a service request from the information providing vehicle 100 when entering a communication range of the base station 400, and may provide the information providing vehicle 100 with a service corresponding to the request.

For example, the base station 400 may provide the information providing vehicle 100 with location information or accident information of the other vehicle 200, real-time traffic information, a digital map, movies, and music. Also, the information providing vehicle 100 may broadcast accident information thereof via the base station 400.

The server 500 may search for information relating to the status information collected by the information providing vehicle 100 and provide the information providing vehicle 100 with a result of the searching. For example, the server 500 may search for articles relating to accident information of other vehicles in real-time and provide the information providing vehicle 100 with the articles, or may search for map information relating to a destination and provide the information providing vehicle 100 with the map information. Also, the server 500 according to the present exemplary embodiment may receive status information collected by the information providing vehicle 100 and may store or manage the status information.

Figure 2A:
FIGS. 2A through 2C are diagrams illustrating a communication method of an information providing vehicle, according to an exemplary embodiment with external vehicles.
Figure 2B:
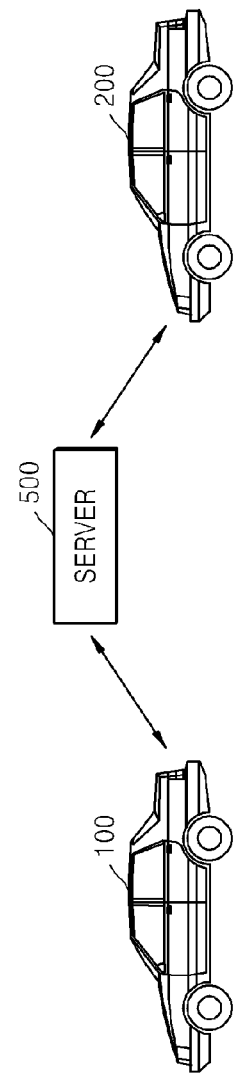
Figure 2C:
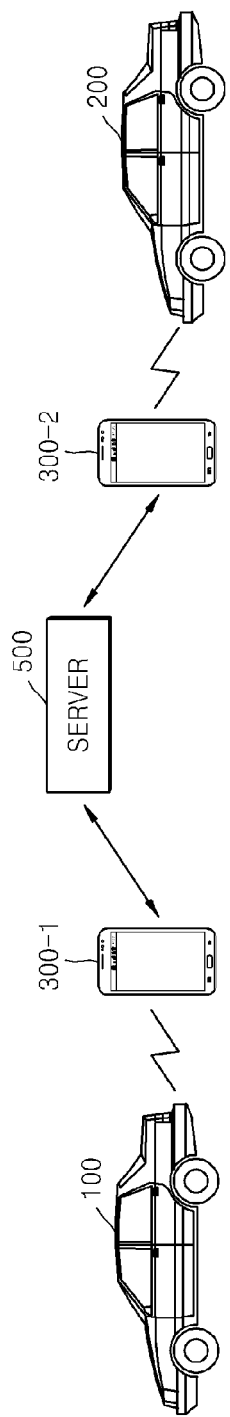

FIGS. 2A through 2C are diagrams illustrating communication methods between the information providing vehicle 100 and the other vehicle 200. As shown in FIG. 2A, the information providing vehicle 100 and the other vehicle 200 may perform vehicle to vehicle (V2V) communication. The V2V communication (for example, IEEE 802.11p WAVE) may provide high mobility, and is suitable for an outdoor environment where interference such as Doppler shift occurs frequently. The V2V communication is performed between the vehicles moving at high speed, and thus, frequency selective fading often occurs. Otherwise, the information providing vehicle 100 may communicate with the other vehicle 200 according to an ad-hoc type communication method. The ad-hoc type is a type of communication for transmitting data between terminals in a peer to peer (P2P) method without using an access point (AP), for example, a wireless router. As shown in FIG. 2B, the information providing vehicle 100 may communicate with the other vehicle 200 via a cellular network. For example, when the information providing vehicle 100 transmits data to the server 500 via the cellular network, the server 500 may transfer the data transmitted from the information providing vehicle 100 to the other vehicle 200. On the contrary, the server 500 may receive data from the other vehicle 200, and may transfer the data to the information providing vehicle 100.

As shown in FIG. 2C, a mobile terminal 300-1 in the information providing vehicle 100 and a mobile terminal 300-2 in the other vehicle 200 may communicate with each other via the cellular network or a wireless local area network (LAN) (WiFi). In this case, the information providing vehicle 100 may perform short distance communication with the mobile terminal 300-1 in the information providing vehicle 100. Also, the other vehicle 200 may perform short distance communication with the mobile terminal 300-2 in the other vehicle 200.

The short distance communication may include a wireless LAN which may be a Wi-Fi, Bluetooth, Zigbee, Near Field Communication (NFC), Wi-Fi direct (WFD), or infrared data association (IrDA) network.

In addition, the information providing vehicle 100 may form a group with a plurality of other vehicles via an ad-hoc network. For example, if four people A, B, C, and D drive their own vehicles to the same destination, the vehicle of A, the vehicle of B, the vehicle of C, and the vehicle of D may form a group via an ad-hoc network connection.

The information providing vehicle 100 and the plurality of other vehicles that are grouped together may share multimedia contents or information provided by a navigation device. The information provided by the navigation device may include shortest route information, current location information, and map information.

Also, the information providing vehicle 100 and the plurality of other vehicles that are grouped together may use common verification information (for example, a common personal identification number (PIN)) for security.

Hereinafter, a structure of the information providing vehicle 100 will be described in detail with reference to FIGS. 3A and 3B.

Figure 3A:
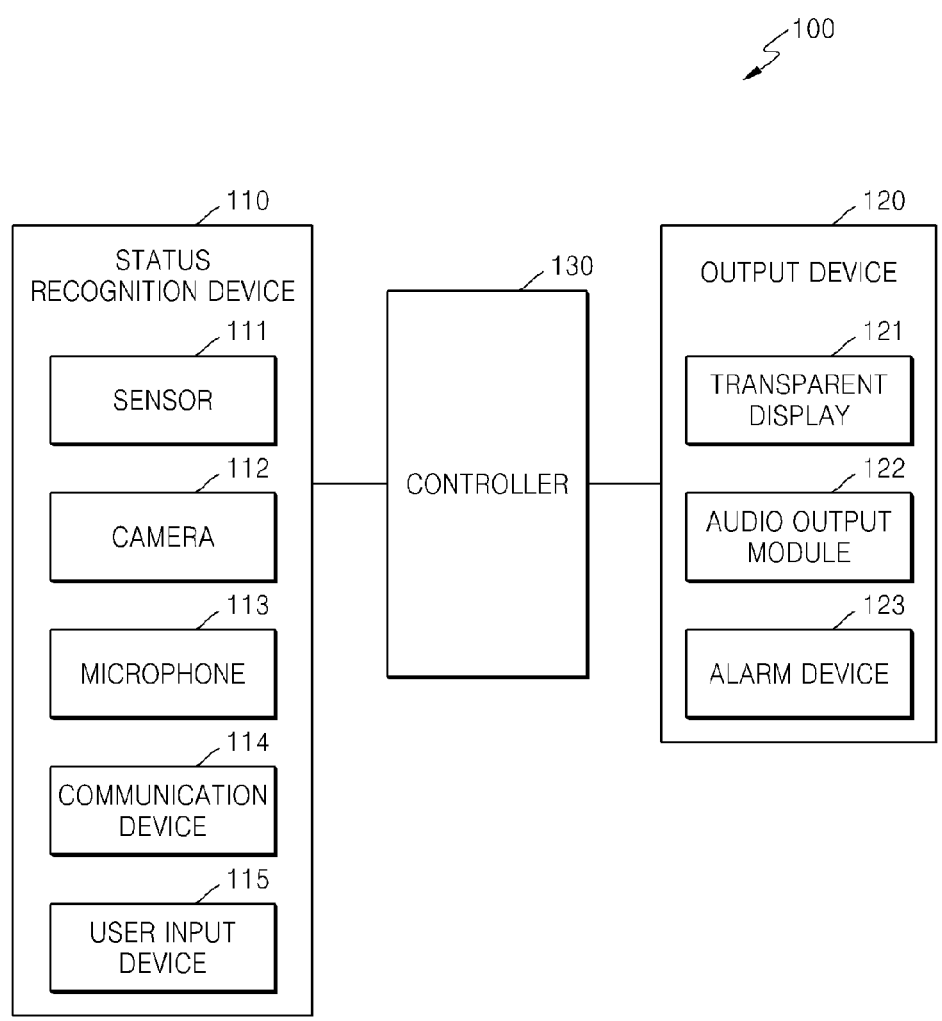
FIG. 3A is a block diagrams of an information providing vehicle according to an exemplary embodiment.

FIG. 3A is a block diagram illustrating the information providing vehicle 100 according to an exemplary embodiment.

As shown in FIG. 3A, the information providing vehicle 100 according to the present exemplary embodiment may include a status recognition device 110, an output 120, and a controller 130. However, all of the components shown in FIG. 3A may not be essential elements. The information providing vehicle 100 may include more components than those of FIG. 3A, or less components than those of FIG. 3A.

Hereinafter, the above components will be described.

The status recognition device 110 may include various modules for acquiring status information inside or outside the vehicle 100. For example, the status recognition device 110 may include a sensor 111, a camera 112, a microphone 113, a communication device 114, and a user input 115.

The sensor 111 may include various sensors for acquiring status information in the vehicle 100. For example, the sensors may include an acceleration sensor, a tilt sensor, a gyro sensor, a 3-axis magnetic sensor, a voice recognition sensor, an illumination sensor, and a temperature sensor, but is not limited thereto.

The sensor 111 may acquire status information such as fuel status information, engine status information (engine status, engine oil status, and timing belt status information), tire information (degree of tire abrasion, air pressure, and warping status), driving speed information, driving direction information, and turning light status information of the information providing vehicle 100.

In this case, the sensor 111 may acquire defect occurrence information regarding the vehicle. For example, the sensor 111 may acquire defect information such as information that a tire is worn out more than a critical value, a pneumatic pressure of the tire is lower than a critical value, an engine oil level is less than a critical value, and a brake does not operate optimally.

Also, the sensor 111 may determine whether it is day or night by using an illuminance sensor, and the sensor 111 may acquire a degree of brightness in daytime or illuminance information according to eye orientation of the driver. The illuminance denotes a density of flux per unit area, and is represented in units of lux.

Otherwise, the sensor 111 may recognize a front vehicle by using a radar sensor.

The camera 112 is for inputting a video signal, and processes an image frame such as a still image or a moving image obtained by using an image sensor. The image frame processed in the camera 112 may be stored in a memory or transmitted to an external source via the communication device 114. The number of cameras 112 may be two or more according to the exemplary embodiments. For example, the camera 112 may be formed as a front camera, a rear camera, a left camera, a right camera, an inside camera, a black box camera, etc. Also, the camera 112 according to the present exemplary embodiment may include an infrared ray (IR) camera.

The camera 112 may acquire background information about objects, geographical features, and roads nearby the vehicle. That is, the camera 112 may recognize buildings, mountains, other vehicles, pedestrians, traffic lanes, headlights, and roadside trees located within a predetermined distance range from the information providing vehicle 100. Here, the status recognition device 110 may recognize shapes or kinds of obstacles from the background information, which interfere with the driver seeing a target object or a target route via the transparent display 121, based on the GPS information or a vision technology.

Also, the camera 112 may recognize a plate number or a make and model of the other vehicle 200. In addition, the camera 112 may recognize a location of the driver's eyes (direction of sight). Here, the status recognition device 110 may detect and trace the eyes of the driver by using an IR light emitting diode (LED). When the infrared LED is placed close to an axis of a camera, the retina of the eyes, which is rich in blood, usually reflects light, and thus, the pupils of the eyes appear to be brighter than usual. This is called a "bright pupil effect," and may be useful in detecting and tracking the pupils of the eyes.

The microphone 113 receives an audio signal from outside and processes the audio signal as electrical voice data.

The microphone 113 may execute various noise reduction algorithms for removing noise generated while receiving the outside audio signal.

The communication device 114 may include one or more elements enabling communications between the information providing vehicle 100 and the other vehicle 200, between the information providing vehicle 100 and the mobile terminal 300, between the information providing vehicle 100 and the base station 400, and between the information providing vehicle 100 and the server 500. For example, the communication device 114 may include a mobile communication module, a wireless internet module, a short distance communication module, and a location information module.

The mobile communication module transmits or receives wireless signals to or from at least one of the base station, another terminal, the server, and the other vehicle on a mobile communication network. The wireless internet module is a module for connecting wireless internet, and may be built-in or installed outside.

The short distance communication module is for communicating within a short distance range and may be, for example, a Bluetooth, radio frequency identification (RFID), infrared data association (IrDA), ultra wideband (UWB), Zigbee, near field communication (NFC), or Wi-Fi direct (WFD) based module.

Also, the location information module is for identifying or acquiring a location of the mobile terminal and may be, for example, a GPS module. The GPS module receives location information from a plurality of satellites. Here, the location information may include coordinate information represented by latitude and longitude. The GPS module may obtain information about the latitude, the longitude, and height, three-dimensional speed information, and accurate time information from the location information received from the plurality of satellites.

The communication device 114 may receive status information from outside of the vehicle from at least one of the other vehicle 200, the mobile terminal 300, the base station 400, and the server 500. For example, the communication device 114 acquires information about an external vehicle from the base station 400, based on identification (ID) information of the external vehicle that is cross-certified with respect to a location information exchange with the vehicle 100. The information about the external vehicle according to the present exemplary embodiment may include at least one of route information of the external vehicle, driving speed information of the external vehicle, stoppage status information of the external vehicle, traffic lane information of the external vehicle, and manipulation status information of the external vehicle.

The communication device 114 may acquire destination guide information, accident information of the other vehicle 200, traffic status information (for example, traffic jam information, the number of traffic lanes, road width, road classification, limited height, limited weight, etc.).

The communication device 114 requests a predetermined external vehicle to exchange location information based on ID information of the external vehicle, and may receive an acceptance message with respect to the request for the location information exchange from the predetermined external vehicle.

The user input 115 receives data input by the driver for controlling operations of the information providing vehicle 100. That is, the user input 115 may acquire information set by the driver (for example, destination input information, temperature setting information in the vehicle, radio frequency setting information, etc.), and device manipulation information (for example, accelerator manipulation information, steering wheel manipulation information, brake manipulation information, and gear manipulation information). The user input 115 may include a keypad, a dome switch, a touch pad (resistive/capacitive), a jog wheel, or a jog switch. In particular, if the touch pad and the display 121, which will be described later, form a layered structure, the structure may be referred to as a touch screen. The user input 115 may receive the ID information of the external vehicle for requesting the location information exchange from the driver.

Also, the user input 115 may include a voice recognition module for receiving a voice command of the driver. The voice recognition module recognizes the voice of the user by using a voice recognition engine, and transfers the recognized voice to the controller 130.

The user input 115 may exist as a remote controller. For example, a remote controller for manipulating the transparent display screen may be attached to the steering wheel. According to the present exemplary embodiment, the remote controller may be realized as various types, for example, an exclusive remote controller for the driver, a smartphone, a mobile phone, or a tablet PC.

The output device 120 outputs an audio signal or a video signal, or an alarm signal, and may include a transparent display 121, a sound output module 122, and an alarm device 123.

The transparent display 121 displays and outputs the information processed by the information providing vehicle 100. For example, the transparent display 121 may display an image (user interface (UI) or a graphic user interface (GUI)) corresponding to the status information acquired by the status recognition device 110. Here, the transparent display 121 may display the image corresponding to the status information based on an augmented reality mode.

An augmented reality technology shows a user a view of real objects overlaid with virtual objects. The augmented reality shows an image by combining the view of real objects with a virtual image having additional information in real-time, and thus, may be referred to as mixed reality (MR).

The transparent display 121 may display the image corresponding to the status information after mapping the image to a map.

In addition, as described above, if the transparent display 121 and the touch pad form a layered structure to configure a touch screen, the transparent display 121 may be used as an input device, as well as the output device. The transparent display 121 may include at least one of a liquid crystal display (LCD), a thin film transistor (TFT) LCD, an organic light-emitting diode (OLED), a flexible display, and a three-dimensional (3D) display. In addition, two or more transparent displays 121 may be disposed according to the type of the information providing vehicle 100. For example, the transparent display 121 may be disposed at each of a front window, side windows, and a rear window of the information providing vehicle 100.

The audio output module 122 outputs audio data that is received from the communication device 114 or stored in a memory (not shown). Also, the audio output module 122 outputs audio signals relating to the functions performed by the information providing vehicle 100 (voice guidance to destination, voice guidance about traffic status, etc.). The audio output module 122 may include a speaker or a buzzer.

The alarm device 123 outputs a signal for notifying about an occurrence of an event in the information providing vehicle 100. Examples of the event occurring in the information providing vehicle 100 may include occurrence of an internal defect in the vehicle, receipt of accident information of other vehicles, and a lack of fuel in the vehicle. The alarm device 123 may output a signal for notifying about the occurrence of the event in other manners, besides the audio signal or the video signal. For example, the alarm device 123 may output a vibration signal.

The controller 130 generally controls overall operations of the information providing vehicle 100. That is, the controller 130 may control the status recognition device 110, and the output device 120. For example, the controller 130 may determine a display mode for displaying the object corresponding to the external vehicle, based on the status information of the external vehicle. Here, the display mode may include the augmented reality mode and a map mode, but is not limited thereto.

The controller 130 may generate an image corresponding to the status information, based on the status information acquired by the status recognition device 110. The image corresponding to the status information may include a moving picture, as well as a still image. The controller 130 may generate an image corresponding to the status information in the information providing vehicle 100, or outside of the information providing vehicle 100.

According to the present exemplary embodiment, the controller 130 may generate new images in real-time, based on the status information. Also, according to another exemplary embodiment, the controller 130 may extract previously generated images from the memory, or may edit the extracted images according to the status information, based on the status information. Meanwhile, the controller 130 may generate the image corresponding to the status information by mapping the image to a map.

The controller 130 may adjust transparency of the transparent display 121 based on illuminance information outside of the information providing vehicle 100. For example, the controller 130 reduces the transparency of the transparent display 121 when the illuminance is high (sunny days), and may increase the transparency of the transparent display 121 when the illuminance is low (cloudy days). Also, the controller 130 may adjust the transparency of the transparent display 121 to be different according to change in locations. In addition, if the transparency of the transparent display 121 is not uniform, the controller 130 may generate a gradation effect to represent the transparency naturally.

Since the transparent display 121 is formed of a transparent device, the controller 130 may adjust the transparency of the transparent display 121 by adjusting light transmittance of the transparent device or adjusting an RGB value of each pixel.

According to the present exemplary embodiment, the controller 130 may adjust the transparency of the transparent display 121 based on illuminance information according to an orientation of the driver's eyes. For example, if the driver drives the vehicle while facing the sunlight, the controller 130 reduces the transparency of the transparent display 121, and if the driver drives the vehicle with the sun behind his or her back, the controller 130 may increase the transparency of the transparent display 121.

In addition, if the transparent display 121 is formed of a combination of an OLED and an LCD, the controller 130 may maintain the transparent display 121 to be transparent like a glass, and then, may set the transparent display 121 to be opaque by applying electric power to the transparent display 121 so that the LCD may block the light.

According to the present exemplary embodiment, the controller 130 may set an opaque region on a partial area or an entire area of the transparent display 121 based on the background information outside the vehicle. For example, the controller 130 may change a color of a partial area or the entire area of the transparent display 121 so as to improve awareness of the peripheral status, according to colors of buildings or geographical features around the information providing vehicle 100. According to the present exemplary embodiment, the controller 130 may set an opaque color on the transparent display 121 based on the user input.

According to the present exemplary embodiment, the controller 130 may broadcast accident information of the information providing vehicle 100 via the communication device 114.

The information providing vehicle 100 may further include a memory (not shown). The memory (not shown) may store a program for processing and controlling the controller 130, or may temporarily store the input/output data (for example, the status information in the vehicle 100, the status information outside of the vehicle 100, the still images, the moving pictures, etc.).

The memory (not shown) may include at least one type of storage medium from among a flash memory type, a hard disk type, a multimedia card micro type, a card type memory (for example, SD or XD memory), a random access memory (RAM), a static RAM (SRAM) a read only memory (ROM), an electrically erasable programmable ROM (EEPROM), a programmable ROM (PROM), a magnetic memory, a magnetic disk, and an optical disk. Also, the information providing vehicle 100 may have a web storage function performing as a memory (not shown) on the Internet.

Hereinafter, the transparent display 121 according to the present exemplary embodiment will be described in detail with reference to FIG. 3B.

The transparent display 121 may be realized in various types, for example, a transparent LCD type display, a transparent thin film electroluminescent (TFEL) panel type display, a transparent OLED type display, and a projection type display. Hereinafter, various examples of the transparent display 121 will be described.

The transparent LCD type display is a transparent display formed by removing a backlight unit from a current LCD device and forming a pair of polarization plates, an optical film, a transparent TFT, and a transparent electrode. The transparent LCD type display has a low transparency due to the polarization plates or the optical film, and has a low optical efficiency because peripheral light is used instead of the backlight unit. However, a large-sized transparent display may be realized by using the transparent LCD.

The transparent TFEL type display is a device using an alternating current (AC) type inorganic thin film EL (AC-TFEL) display formed of a transparent electrode, an inorganic phosphor, and an insulating film. The AC-TFEL display emits light when accelerated electrons pass through the inorganic phosphor to excite the phosphor. If the transparent display 121 is the transparent TFEL type display, the controller 130 may adjust the electrons to be projected to an appropriate location to determine a location displaying the information. Since the inorganic phosphor and the insulating film are transparent, the transparent display having high transparency may be easily obtained.

Otherwise, the transparent OLED type display is a transparent display using an OLED that emits light by itself. Since an organic emission layer is transparent, the OLED may serve as the transparent display device provided that opposite electrodes are realized as transparent electrodes. In the OLED, electrons and holes are injected from opposite sides of the organic emission layer to be combined in the organic emission layer and emit light. The transparent OLED type display may display the information by injecting the electrons and holes to desired locations.

Figure 3B:
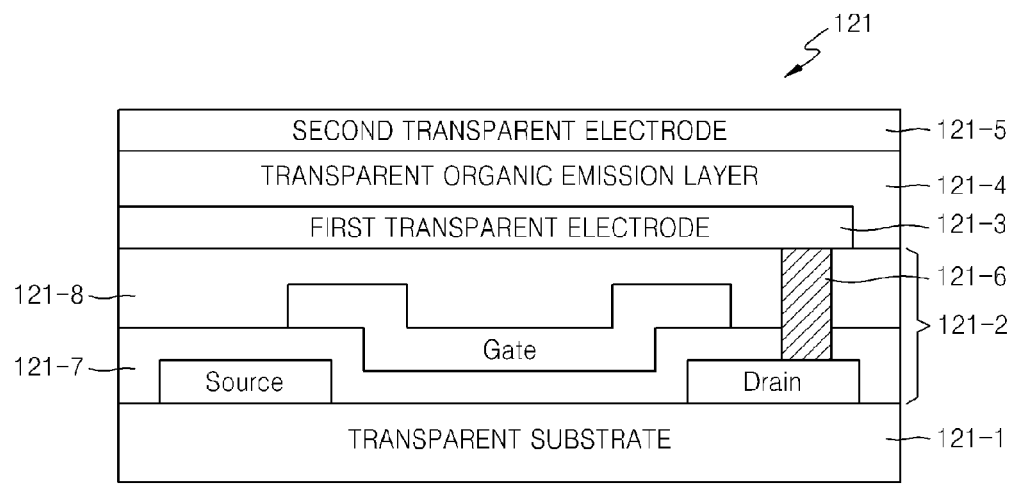
FIG. 3B is a diagram showing a detailed configuration of a transparent display according to an exemplary embodiment.

FIG. 3B is a diagram showing a detailed configuration of the transparent display 121 formed of a transparent OLED. For convenience of description, the transparent display formed as the transparent OLED type is denoted by reference numeral 121.

Referring to FIG. 3B, the transparent display 121 includes a transparent substrate 121-1, a transparent transistor layer 121-2, a first transparent electrode 121-3, a transparent organic emission layer 121-4, a second transparent electrode 121-5, and a connection electrode 121-6.

The transparent substrate 121-1 may be formed of a polymer material that is transparent such as plastic, or a glass material. The material forming the transparent substrate 121-1 may be determined according to an environment where the transparent display 121 is used. For example, the polymer material is light and flexible, and thus may be applied to a portable display device. The glass material may be applied to show windows or general windows.

The transparent transistor layer 121-2 is a layer including a transistor that is fabricated by replacing opaque silicon used in a related art TFT with a transparent material such as transparent zinc oxide or titanium oxide. In the transparent transistor layer 121-2, a source, a gate, a drain, and various dielectric layers 121-7 and 121-8 are formed, and the connection electrode 121-6 for electrically connecting the drain to the first transparent electrode 121-3 may be formed. Although FIG. 3B shows one transparent TFT including the source, the gate, and the drain in the transparent transistor layer 121-3, the transparent transistor layer 121-2 includes a plurality of transparent transistors that are evenly distributed throughout the entire display surface of the transparent display 121. The controller 130 applies a control signal to the gate in each of the transistors in the transparent transistor layer 121-2 to drive the corresponding transparent transistor and display information.

The first transparent electrode 121-3 and the second transparent electrode 121-5 are disposed at opposite sides to each other while the transparent organic emission layer 121-4 is interposed. The first transparent electrode 121-3, the transparent organic emission layer 121-4, and the second transparent electrode 121-5 form an OLED.

The transparent OLED may be classified as a passive matrix OLED (PMOLED) and an active matrix OLED (AMOLED) according to a driving method thereof. The PMOLED has a structure in which points where the first and second transparent electrodes 121-3 and 121-5 cross each other form pixels. However, in the AMOLED, a TFT is disposed to drive each of the pixels. FIG. 3B shows the AMOLED.

Each of the first and second transparent electrodes 121-3 and 121-5 includes a plurality of line electrodes that are arranged perpendicularly to each other. For example, if the line electrodes of the first transparent electrode 121-3 are arranged in a horizontal direction, the line electrodes of the second transparent electrode 121-5 are arranged in a longitudinal direction. Accordingly, there are a plurality of crossing areas between the first and second transparent electrodes 121-3 and 121-5. The transparent transistor is connected to each of the crossing areas as shown in FIG. 3B.

The controller 130 generates a potential difference in each of the crossing areas by using the transparent transistor. The electrons and holes are induced to the transparent organic emission layer 121-4 from the first and second electrodes 121-3 and 121-5 within the crossing area where the potential difference is generated, and then, are combined with each other to emit light. On the other hand, the crossing area where the potential difference is not generated does not emit light, and accordingly, a background image of the rear surface is transmitted therethrough.

Indium tin oxide (ITO) may be used as the first and second transparent electrodes 121-3 and 121-5. Otherwise, a newly developed material such as graphene may be used. Graphene is a material having a honeycomb-shaped plane structure in which carbon atoms are connected to each other and it also has a transparent property. Otherwise, the transparent organic emission layer 121-4 may be formed of various other materials.

In addition, as described above, the transparent display 121 may be formed as the projection type display, as well as the transparent LCD type display, the transparent TFEL type display, and the transparent OLED type display. The projection type display employs a method of displaying an image by projecting the image to a transparent screen such as a head-up display (HUD).

Hereinafter, a method of providing the driver or a passenger with status information of a predetermined external vehicle via the transparent display 121, performed by the information providing vehicle 100, will be described with reference to FIGS. 4 and 5.

Figure 4:
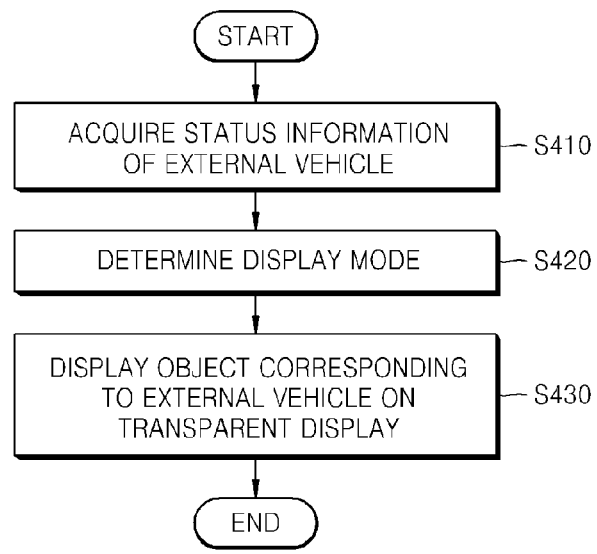
FIG. 4 is a flowchart illustrating an information providing method performed via a transparent display, according to an exemplary embodiment.

FIG. 4 is a flowchart illustrating a method of providing information via the transparent display 121 according to an exemplary embodiment.

In operation S410, the information providing vehicle 100 may acquire status information of a predetermined external vehicle. The status information of the external vehicle may include at least one of location information of the external vehicle, route information of the external vehicle, driving speed information, stoppage status information, used traffic lane information, and turning light status information. The predetermined external vehicle may be a vehicle that is cross-certified with respect to a location information exchange with the information providing vehicle 100.

The information providing vehicle 100 may receive the status information from the external vehicle via a predetermined network. For example, the information providing vehicle 100 may receive the status information of the external vehicle from the external vehicle via communication between the vehicles, an ad-hoc network, or a mobile communication network. Also, the information providing vehicle 100 may receive the status information of the external vehicle from base stations located at roadsides.

In operation S420, the information providing vehicle 100 may determine a display mode for displaying an object corresponding to the external vehicle, based on the status information of the external vehicle. The display mode may include an augmented reality mode and a map mode. The augmented reality mode shows an image obtained by overlaying a virtual image with the view of reality seen from the eyes of the user. In the map mode, the status information of the external vehicle is displayed on a map to which the status information has been mapped.

In operation S430, the information providing vehicle 100 may display the object corresponding to the external vehicle via the transparent display 121 in the determined display mode.

The object corresponding to the external vehicle may include an identification mark for distinguishing the actual external vehicle that is observed through the transparent display 121 from other vehicles, an image for displaying a location of the external vehicle on the map, or an icon.

That is, if the external vehicle is located within an observable range of the user, the information providing vehicle 100 may display the identification mark of the corresponding external vehicle on the transparent display 121. If the external vehicle is located at a distance beyond the visible range of the user, the location of the external vehicle may be mapped on the map and displayed on the transparent display 121. This will be described in more detail with reference to FIG. 5.

Figure 5:
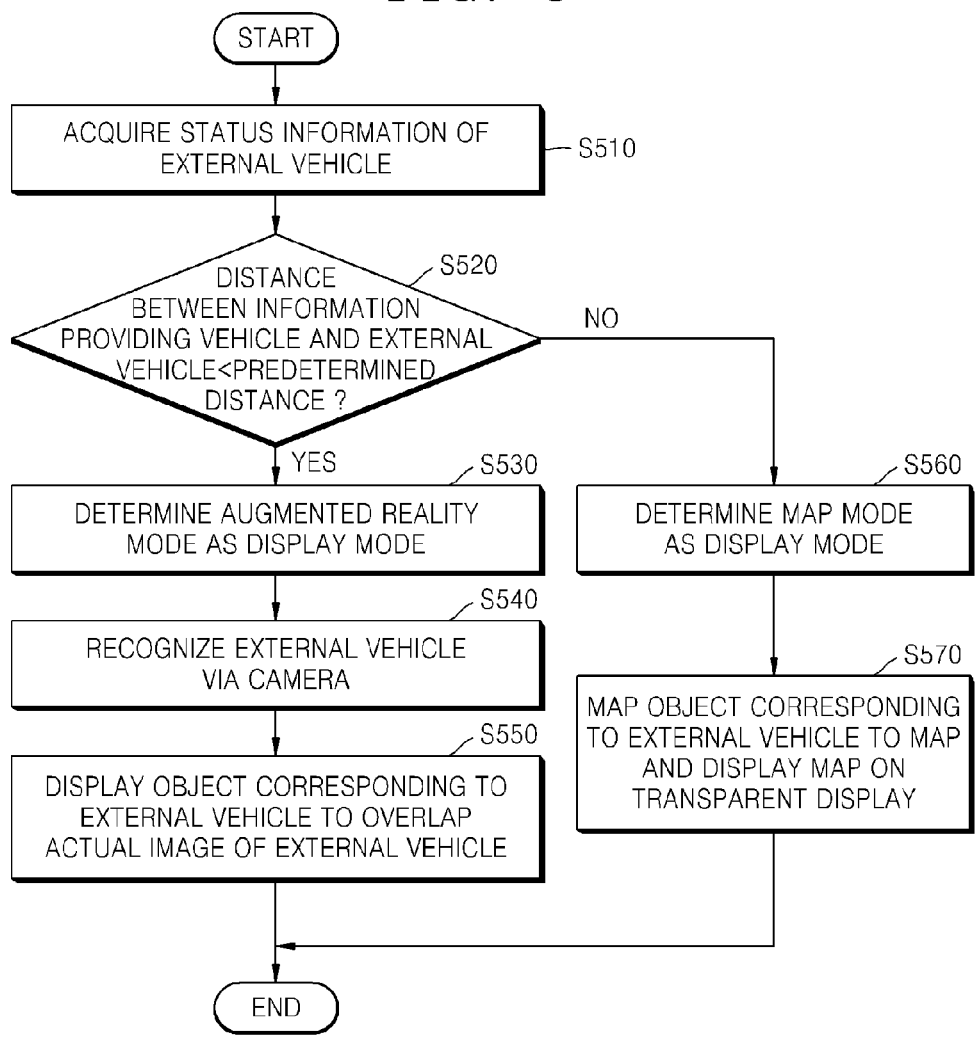
FIG. 5 is a flowchart illustrating an information providing method according to display modes, according to an exemplary embodiment.

FIG. 5 is a flowchart illustrating a method of providing information according to the display mode, according to an exemplary embodiment.

In operation S510, the information providing vehicle 100 may acquire status information of a predetermined external vehicle. The information providing vehicle 100 may determine a distance to the external vehicle 200 based on the location information of the external vehicle included in the acquired status information.

In operation S520, the information providing vehicle 100 may determine the display mode based on the distance between the information providing vehicle 100 and the external vehicle 200. That is, the information providing vehicle 100 may determine the display mode according to whether the distance to the external vehicle 200 is less than a predetermined distance.

According to the present exemplary embodiment, the predetermined distance may include a visible range, in which the driver may see the external vehicle with his or her naked eyes. The information providing vehicle 100 may set an average visible distance as a reference for determining the display mode in advance. In addition, the information providing vehicle 100 may change the visible range according to at least one of weather information, illuminance information, and humidity information. For example, when it rains or illuminance is low, the information providing vehicle 100 may set the visible range to be less than the average visible range.

According to the present exemplary embodiment, the information providing vehicle 100 may determine whether the external vehicle is located within the average visible range by using GPS information of the external vehicle, map information stored in advance, and compass information.

In operation S530, if the distance between the information providing vehicle 100 and the external vehicle is less than the predetermined range, the information providing vehicle 100 may determine the display mode as the augmented reality mode. For example, if the external vehicle 200 is located within the visible range in which the user may see the external vehicle with his or her naked eyes, the information providing vehicle 100 may determine the display mode as the augmented reality mode.

In operation S540, the information providing vehicle 100 may recognize the external vehicle 200 by using the camera. Here, the information providing vehicle 100 may recognize the external vehicle 200 based on at least one of outer appearance information, make and model of the vehicle, and a plate number of the vehicle. For example, the information providing vehicle 100 may recognize the plate number of the external vehicle, which is photographed by the camera, through image processing, and compare the photographed plate number with a plate number of a predetermined external vehicle stored in the memory to recognize the external vehicle. Also, the information providing vehicle 100 may define templates based on the outer appearance information of the external vehicle (for example, a car model, a contour line of a car, etc.), and then, compare the predefined templates with the photographed image to recognize the predetermined external vehicle.

In addition, according to the present exemplary embodiment, the information providing vehicle 100 may set a plurality of candidate vehicles that are recognized through the camera based on at least one of the outer appearance information and the plate number information. In addition, the information providing vehicle 100 may recognize the predetermined external vehicle from among the plurality of candidate vehicles, based on information about the eyes of the driver or the input information of the driver.

For example, when the information providing vehicle 100 selects the plurality of candidate vehicles through the vision technology, the information providing vehicle 100 analyzes the eyes of the driver by using an internal sensor (for example, an internal camera) and may recognize a vehicle on which the eyes of the driver are focused for a predetermined time or longer as the predetermined external vehicle.

Also, the information providing vehicle 100 may display the plurality of candidate vehicles on the transparent display 121 so that the user may select one of the vehicles. When the transparent display 121 includes a touch interface, the user may touch one of the plurality of candidate vehicles displayed on the transparent display 121 to select the external vehicle that needs to be traced. Also, the user may select the predetermined external vehicle from the plurality of candidate vehicles through the voice input.

In operation S550, the information providing vehicle 100 may display the object corresponding to the external vehicle on the transparent display 121 so that the object may overlap the actual image of the external vehicle. The information providing vehicle 100 may display at least one of the route information of the external vehicle, the driving speed information, the stoppage status information, the used traffic lane information, and the turning light status information on the transparent display 121 to be overlapped with the actual image of the external image. This will be described in more detail later with reference to FIGS. 6 through 10.

In operation S560, the information providing vehicle 100 may determine the display mode as the map mode, if the distance between the information providing vehicle 100 and the external vehicle is equal to or greater than the predetermined range. For example, if the external vehicle is located at a non-visible range, at which the user may not see the external vehicle with his/her naked eyes, the information providing vehicle 100 may determine the display mode as the map mode.

In operation S570, the information providing vehicle 100 maps the object corresponding to the external vehicle on a map, and displays the map on the transparent display 121. In addition, the information providing vehicle 100 may change a scale of the map based on the distance between the information providing vehicle 100 and the external vehicle. For example, the information providing vehicle 100 displays the object corresponding to the external vehicle by mapping the object to a large-scaled map (detailed map) when the distance to the external vehicle is reduced, and displays the object corresponding to the external vehicle by mapping the object to a small-scaled map (map with little detail) when the distance to the external vehicle is increased. This will be described in more detail later with reference to FIGS. 11A and 11B.

According to the present exemplary embodiment, the information providing vehicle 100 may display the object corresponding to the external vehicle on the transparent display 121 by adjusting a display location or a display angle of the object based on the location of the driver's eyes.

The information providing vehicle 100 may change a color of the object corresponding to the external vehicle based on the external illuminance information or illuminance information according to an orientation of the driver's eyes, and then, display the object on the transparent display 121. For example, when the illuminance is high, the information providing vehicle 100 may darken the color of the object corresponding to the external vehicle, and when the illuminance is low, the information providing vehicle 100 may brighten the color of the object corresponding to the external vehicle. The information providing vehicle 100 may change the color of the object corresponding to the external vehicle based on background color.

The information providing vehicle 100 may receive information provided from navigation of the external vehicle and display the information. For example, the information providing vehicle 100 may display map information of the external vehicle.

Figure 6:
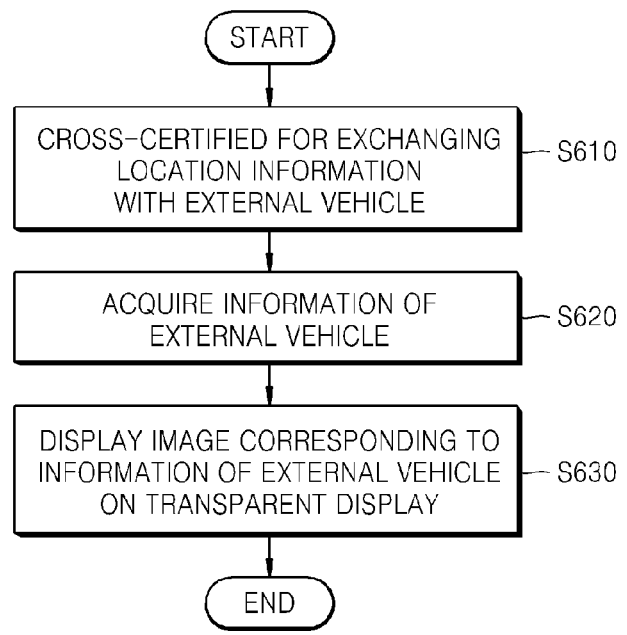
FIG. 6 is a flowchart illustrating a method of providing information about an external vehicle that has a cross-certificate for exchanging location information with the information providing vehicle, according to an exemplary embodiment.

FIG. 6 is a flowchart illustrating a method of providing information about an external vehicle that is cross-certified with respect to a location information exchanged with the information providing vehicle 100.

As shown in FIG. 6, in operation S610, the information providing vehicle 100 may perform cross-certification with respect to a location information exchanged with the external vehicle. For example, when two or more vehicles move to the same destination together, the two or more vehicles may perform the cross-certification with respect to the location information exchanged with each other.

The information providing vehicle 100 may receive identification information of the external vehicle from the driver (or the passenger). The identification information of the external vehicle may include the plate number of the external vehicle. Here, the information providing vehicle 100 may request the external vehicle to exchange the location information based on the identification information of the external vehicle. In addition, the information providing vehicle 100 may receive an acceptance message from the external vehicle. According to the present exemplary embodiment, the request for the location information exchange and the receipt of the acceptance message may be performed via various communication methods such as communication between the vehicles, or mobile communication.

According to the present exemplary embodiment, the information providing vehicle 100 may receive a request for the location information exchanged from the external vehicle, and may transmit an acceptance message to the external vehicle.

In operation S620, the information providing vehicle 100 may acquire information about the external vehicle that performs the cross-certification with respect to the information exchange with the information providing vehicle 100.

The information about the external vehicle may include location information of the external vehicle, route information of the external vehicle, stoppage status information of the external vehicle, traffic lane information of the external vehicle, and manipulation status information of the external vehicle. The manipulation status information of the external vehicle is information about manipulating the turning lights, brakes, accelerator, steering wheel, etc., which is performed by the driver.

The information providing vehicle 100 may acquire information about the external vehicle 200 from the base station 400. For example, when the information providing vehicle 100 transmits the identification information of the external vehicle to the base station 400, the base station 400 may provide the information providing vehicle 100 with the location information of the external vehicle based on the plate number of the external vehicle. Otherwise, the information providing vehicle 100 may receive information about the external vehicle from the external vehicle or a mobile terminal of the external vehicle.

In addition, when the external vehicle is located within a predetermined distance (for example, the external vehicle is observed by the front camera or a black box camera), the information providing vehicle 100 may recognize the plate number or model of the external vehicle by using the black box camera or the front camera. In addition, the information providing vehicle 100 may acquire the location information of the external vehicle based on the recognized plate number or the model of the external vehicle.

In operation S630, the information providing vehicle 100 may display an image corresponding to the information about the external vehicle on the transparent display 121. For example, if the external vehicle is located within a visible range of the driver of the information providing vehicle 100, the information providing vehicle 100 may display the identification mark of the external vehicle on the transparent display 121.

The identification mark of the external vehicle is a mark for distinguishing the external vehicle that is cross-certified with respect to the location information exchanged with the information providing vehicle 100 from the other vehicles. That is, the information providing vehicle 100 may mark a contour line of the external vehicle, or may display an identification image. Also, the information providing vehicle 100 may display the contour line or the identification image of the external vehicle for regular predetermined periods.

According to the present exemplary embodiment, the information providing vehicle 100 may change at least one of a size, a display interval, and a color of the identification mark of the external vehicle based on the distance to the external vehicle.

However, when the external vehicle is located at an invisible distance from the driver of the information providing vehicle 100, the information providing vehicle 100 may display information about the external vehicle on an obstacle existing between the information providing vehicle 100 and the external vehicle. That is, the information providing vehicle 100 may display the information about the external vehicle on the transparent display 121 as augmented reality.

Also, if the external vehicle is located beyond a predetermined distance from the information providing vehicle 100 (for example, when there is an obstacle between the information providing vehicle 100 and the external vehicle), the information providing vehicle 100 may display a virtual image of the external vehicle on the transparent display 121.

According to the present exemplary embodiment, in a case where a vehicle A follows a vehicle B to the destination, a driver of the vehicle A may clearly distinguish the vehicle B from the other vehicles, and may easily identify the location information and a route of the vehicle B via the transparent display 121. Also, a driver of the vehicle B may identify the location of the vehicle A that follows the vehicle B, and thus, the driver of the vehicle B may dictate the driving speed or the traffic lane of the vehicle A.

Figure 7:
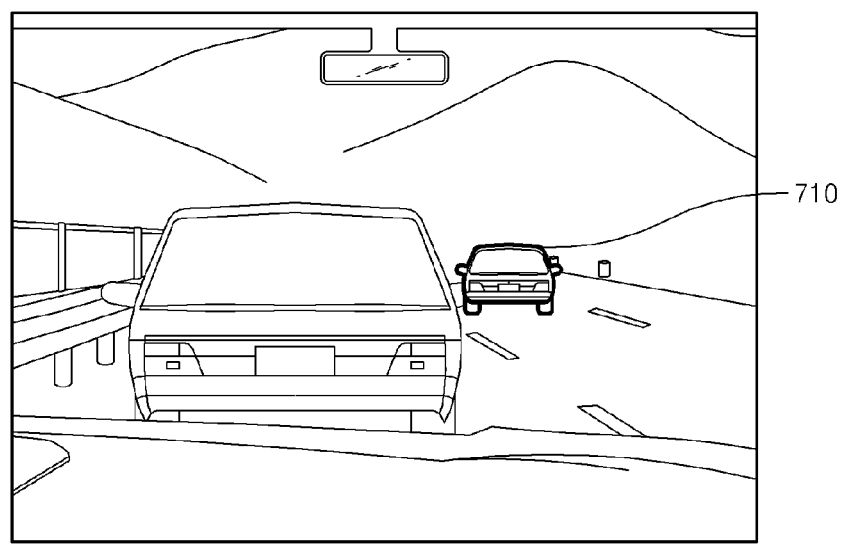
FIG. 7 is a diagram showing an object corresponding to an external vehicle in an augmented reality mode, according to an exemplary embodiment.

FIG. 7 is a diagram showing an object corresponding to the external vehicle in the augmented reality mode, according to an exemplary embodiment.

Referring to FIG. 7, when the external vehicle that is cross-certified with respect to the location information exchanged with the information providing vehicle 100 is recognized via the front camera or the black box camera, the information providing vehicle 100 marks a contour line 710 on the external vehicle via the transparent display 121. In FIG. 7, the identification mark in the form of the contour line 710 is shown as an example of the object corresponding to the external vehicle; however, the exemplary embodiments are not limited thereto.

According to the present exemplary embodiment, the driver (or the passenger) may easily recognize (identify) the external vehicle that has the cross-certificate with respect to the location information exchanged with the information providing vehicle from among the plurality of vehicles that are observed through the front window (or the transparent display 121).

Figure 8:
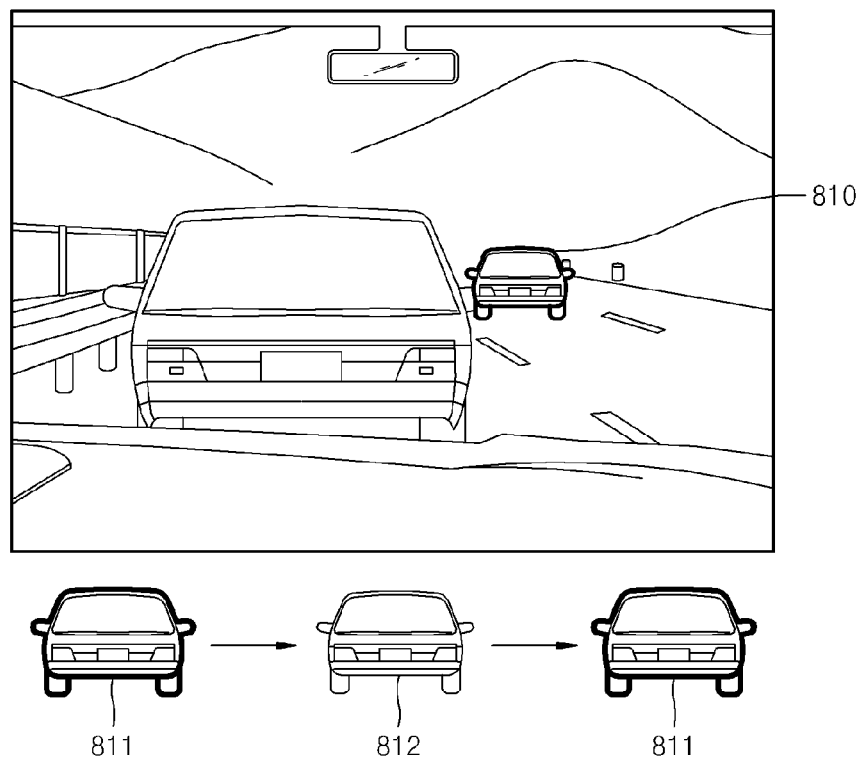
FIG. 8 is a diagram showing a flashing interval for displaying an identification mark, according to an exemplary embodiment.

FIG. 8 is a diagram showing a flashing interval for displaying the identification mark, according to an exemplary embodiment.

As shown in FIG. 8, the information providing vehicle 100 may display the identification mark of the external vehicle as a contour line 810 on the transparent display 121 at predetermined intervals. For example, the information providing vehicle 100 may display the object corresponding to the external vehicle (for example, the identification mark as a contour line 810) on the transparent display 121 at predetermined intervals. That is, the identification mark formed as a contour line may be flashed repeatedly on the transparent display 121 (811→812).

Here, according to the present exemplary embodiment, the information providing vehicle 100 may change the period of flashing of the contour line 810 of the external vehicle based on the distance between the information providing vehicle 100 and the external vehicle. For example, the information providing vehicle 100 may reduce the period of flashing of the contour line 810 when the distance to the external vehicle is reduced. Otherwise, the information providing vehicle 100 may increase the period of flashing of the contour line 810 when the distance to the external vehicle is reduced.

Figure 9:
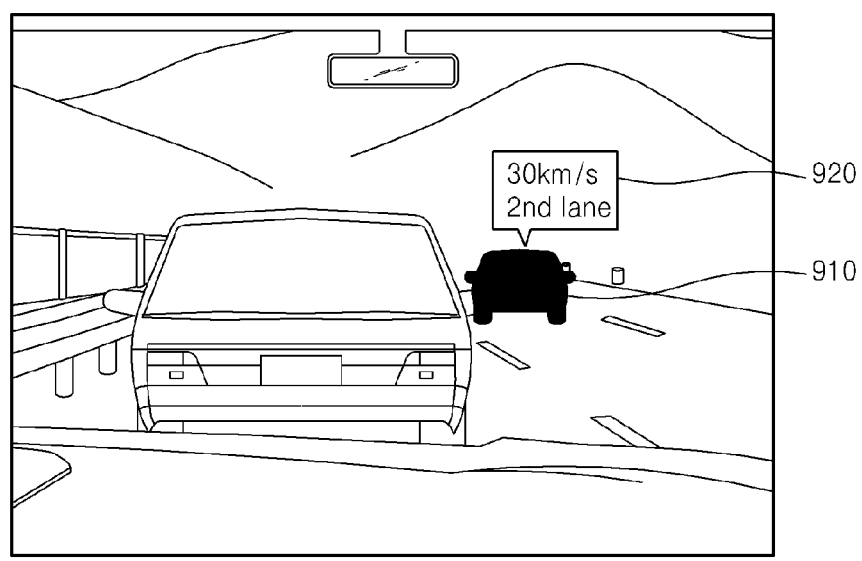
FIGS. 9 and 10 are diagrams showing examples of an identification mark formed as an image corresponding to the external vehicle, according to an exemplary embodiment.
Figure 10:
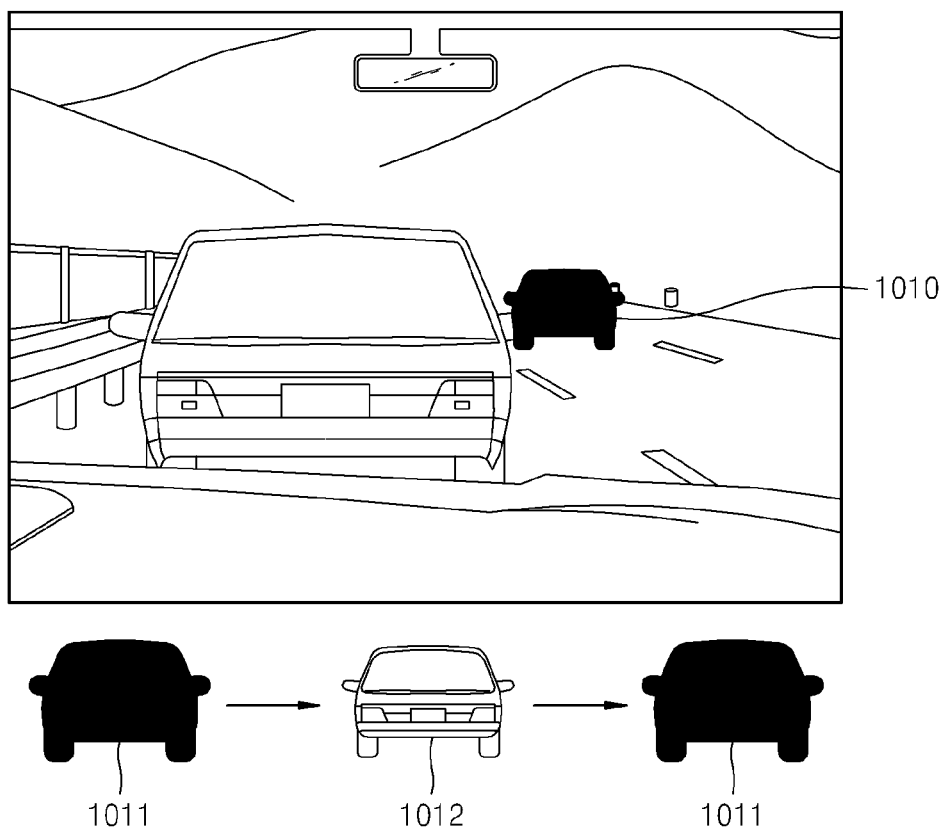

FIGS. 9 and 10 are diagrams showing examples of an identification mark formed as an image corresponding to the external vehicle, according to an exemplary embodiment.

As shown in FIG. 9, when the external vehicle that has been cross-certified with respect to the location information exchange with the information providing vehicle 100 is recognized through the front camera or the black box camera, the information providing vehicle 100 may display an identification image 910 of the external vehicle on the transparent display 121. FIG. 9 shows an identification image 910 formed as a car as an example of the object corresponding to the external vehicle; however, the object corresponding to the external vehicle may be formed to have various shapes, for example, an arrow, a star, a circle, or the like.

Also, the information providing vehicle 100 may display information about a distance to the external vehicle, traffic lane information of the external vehicle (for example, a second lane), turning light manipulation information, and driving speed information of the external vehicle (for example, 30 km/h) 920 on the transparent display 121.

As shown in FIG. 10, according to the present exemplary embodiment, the information providing vehicle 100 may display an identification image 1010 formed as a car on the transparent display 121 at predetermined intervals. Here, according to the present exemplary embodiment, the information providing vehicle 100 may change the period of displaying the identification image 1010 formed as a car based on the distance between the information providing vehicle 100 and the external vehicle or the driving speed of the information providing vehicle 100.

Figure 11A:
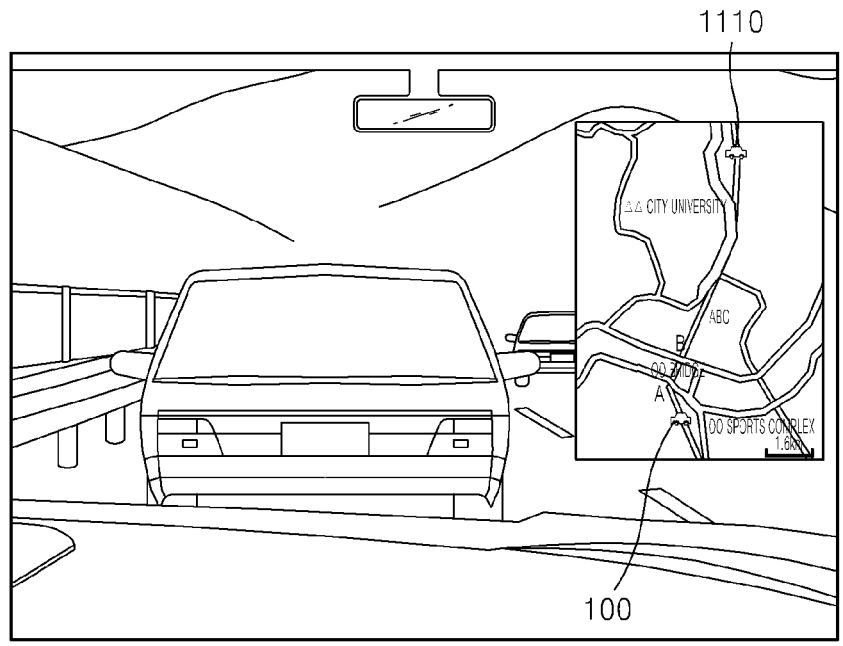
FIGS. 11A and 11B are diagrams showing an object corresponding to the external vehicle in a map mode, according to an exemplary embodiment.
Figure 11B:
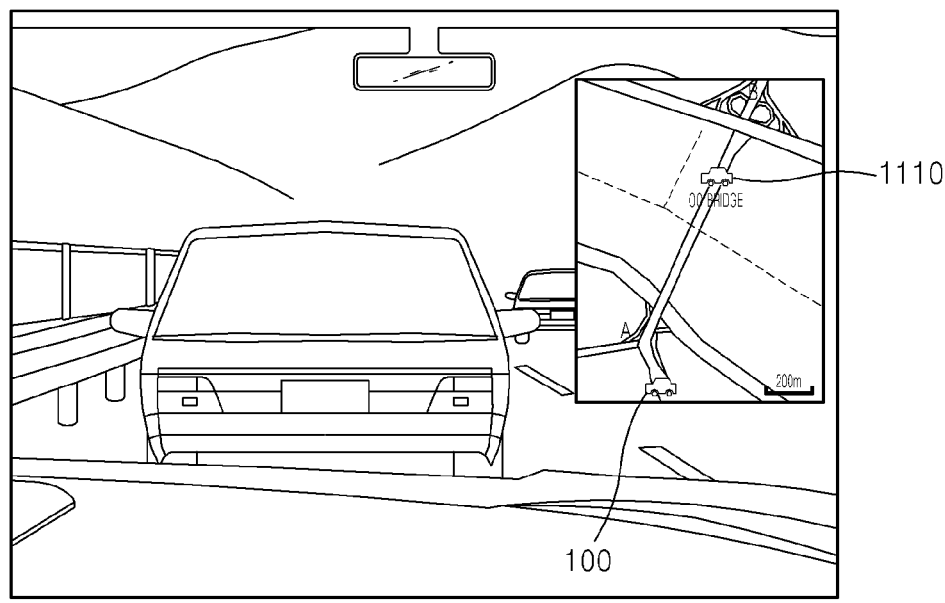

FIGS. 11A and 11B are diagrams showing an object corresponding to the external vehicle in a map mode, according to an exemplary embodiment.

As shown in FIGS. 11A and 11B, in a case where the external vehicle is located at an invisible distance from the driver (for example, 1 km ahead), the information providing vehicle 100 may display an image 1110 representing a location of the external vehicle on a map. Here, the information providing vehicle 100 may change a scale of the map based on the distance between the information providing vehicle 100 and the external vehicle.

For example, the information providing vehicle 100 may increase the scale of the map when the external vehicle is 400 m ahead (FIG. 11B) to be greater than when the external vehicle 1110 is 1 km ahead (FIG. 11A).

Therefore, the information providing vehicle 100 may display the object corresponding to the external vehicle after mapping the object to the large-scaled map when the distance to the external vehicle is reduced. Then, when the external vehicle is close enough to be seen by the driver, the information providing vehicle 100 may display the object corresponding to the external vehicle (for example, the identification image) to overlap with the actual image of the external vehicle.

Figure 12:
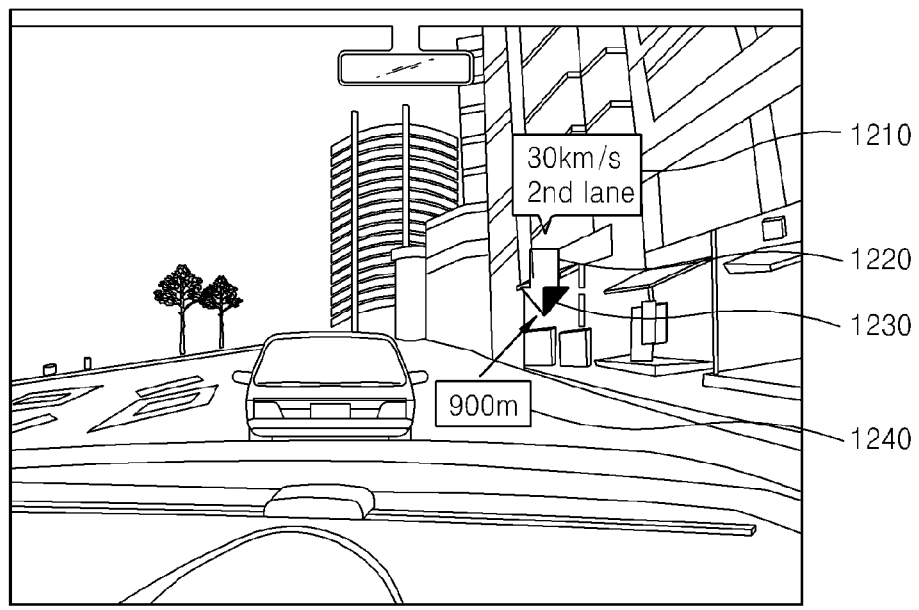
FIG. 12 is a diagram showing a screen providing information about the external vehicle, according to an exemplary embodiment.

FIG. 12 is a diagram showing a screen providing information about the external vehicle according to an exemplary embodiment.

As shown in FIG. 12, if there is an obstacle (for example, a building) exists between the information providing vehicle 100 and the external vehicle and the external vehicle is not recognized by the front camera or the black box camera of the information providing vehicle 100, the information providing vehicle 100 may display the information about the external vehicle on the obstacle through the transparent display 121. For example, if the external vehicle that is being followed by the information providing vehicle 100 is hidden by the building, the information providing vehicle 100 may display the location of the external vehicle on the transparent display 121.

In FIG. 12, the information providing vehicle 100 may represent the location of the external vehicle by using an arrow 1220. That is, the external vehicle is located at a right side of the arrow 1220. Also, the information providing vehicle 100 may display information such as the driving speed of the external vehicle (30 km/h), the traffic lane used by the external vehicle (a second lane) (1210), and the distance to the external vehicle (for example, 900 m) 1240 on the transparent display 121. The information providing vehicle 100 may represent that the external vehicle has turned on the right-side turning light by showing a right side of the arrow 1220 as white, on the transparent display 121.

According to the present exemplary embodiment, the information providing vehicle 100 may trace another vehicle that was not cross-certified for exchanging the location information with the information providing vehicle 100. For example, if the information providing vehicle 100 is a police car, the information providing vehicle 100 may unilaterally track the other vehicle that violates traffic rules.

Here, according to the present exemplary embodiment, the information providing vehicle 100 may photograph the number plate and shape of the tracked vehicle by using the black box camera or the front camera. In addition, the information providing vehicle 100 may recognize numbers and letters on the photographed plate by using an image processing technology, and may store the numbers and letters of the plate in a database. Also, the information providing vehicle 100 may recognize the model of the photographed vehicle by using the image processing technology, and may store the car model in the database.

According to the present exemplary embodiment, the information providing vehicle 100 may recognize the tracked vehicle based on the car model or the number plate, and display an identification mark of the tracked vehicle on the transparent display 121. Therefore, according to the present exemplary embodiment, the information providing vehicle 100 may track the other vehicle easily.

In addition, according to another exemplary embodiment, the information providing vehicle 100 may receive a plate number of the tracked vehicle from an external source. In this case, the information providing vehicle 100 may transmit the plate number to the peripheral base station 400.

In addition, the information providing vehicle 100 may receive the location of the tracked vehicle based on the number of the vehicle as GPS information from the base station 400. Here, the information providing vehicle 100 may display the location of the tracked vehicle on the transparent display 121 based on the GPS information of the tracked vehicle.

Figure 13:
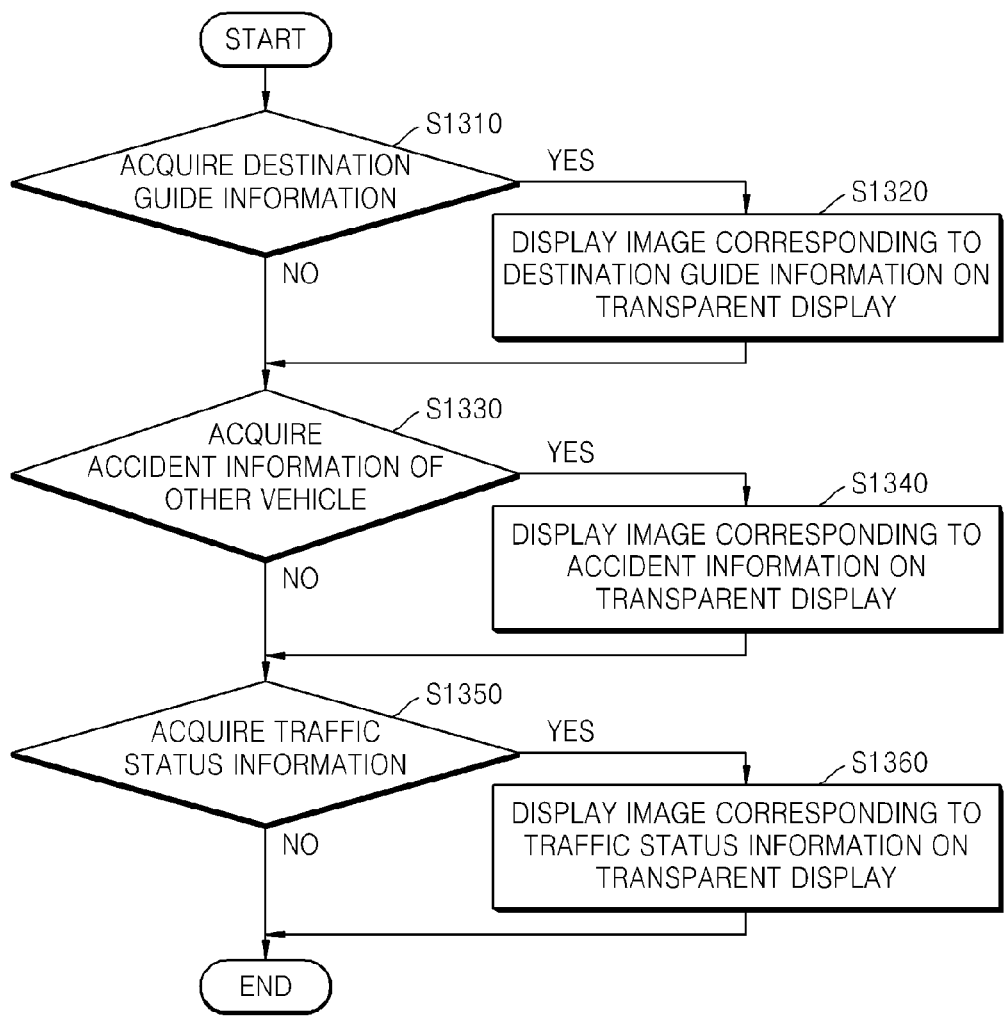
FIG. 13 is a flowchart illustrating a method of providing destination guide information, accident information of other vehicles, and traffic status information, according to an exemplary embodiment.

FIG. 13 is a flowchart illustrating a method of providing destination guide information, accident information of other vehicles, and traffic status information, according to an exemplary embodiment.

In operation S1310, the information providing vehicle 100 may acquire destination guide information. That is, when receiving destination information from the driver (or the passenger), the information providing vehicle 100 may search for route guide information to the destination. According to the present exemplary embodiment, the information providing vehicle 100 may receive the destination guide information from the base station 400 or the server 500.

The destination guide information according to the present exemplary embodiment may include location information of the destination, information about a distance to the destination, information about a route to the destination, speed limit information, and speed camera information.

In operation S1320, the information providing vehicle 100 may display an image corresponding to the destination guide information on the transparent display 121. Here, according to the present exemplary embodiment, the information providing vehicle 100 may display the destination guide information in the augmented reality mode or the map mode.

In operation S1330, the information providing vehicle 100 may acquire accident information of another vehicle 200. If the other vehicle 200 is involved in a traffic accident, the other vehicle 200 may transmit the accident information to the base station 400 or the server 500. Therefore, the information providing vehicle 100 may receive the accident information of the other vehicle 200 from the base station 400 or the server 500. According to another exemplary embodiment, the information providing vehicle 100 may directly receive the accident information from the other vehicle 200 via a vehicle to vehicle (V2V) communication network.

The accident information according to the present exemplary embodiment may include a location where the accident occurs, a traffic lane in which the accident occurred, a detour route, and a time when the accident occurred.

In operation S1340, the information providing vehicle 100 may display an image corresponding to the accident information of the other vehicle 200 on the transparent display 121. For example, the information providing vehicle 100 may display an image corresponding to at least one of the information about the location where the accident occurred, the information about the traffic lane in which the accident occurred, and the detour information on the transparent display 121.

In operation S1350, the information providing vehicle 100 may acquire traffic status information. The traffic status information according to the present exemplary embodiment may include traffic jam information, the number of lanes, a width of the road, road classification, limited height, and limited weight.

In operation S1360, the information providing vehicle 100 may display an image corresponding to the traffic status information on the transparent display 121.

According to the exemplary embodiments, an order of the operations S1310 through S1360 may be changed, and some of the operations may be omitted.

Figure 14:
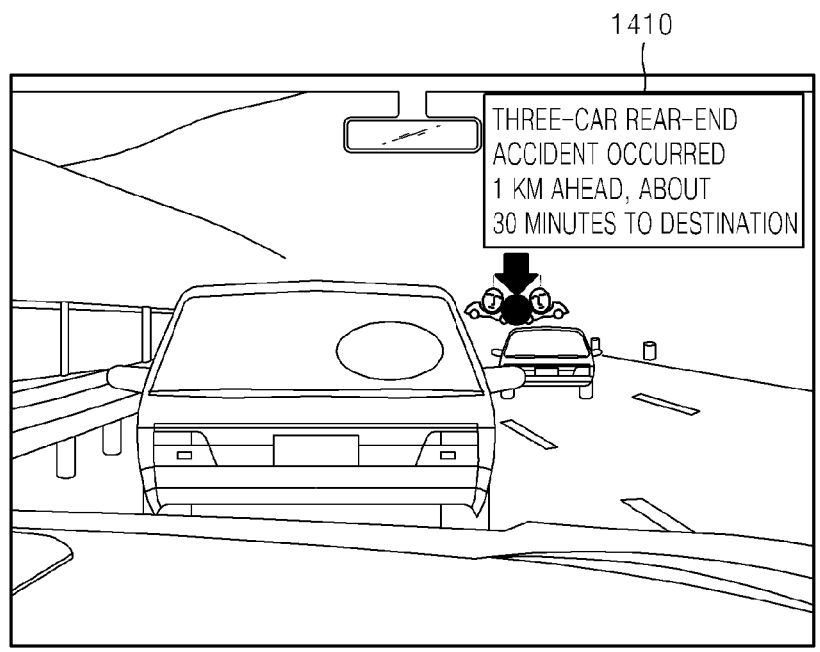
FIG. 14 is a diagram showing a screen displaying an image corresponding to accident information of another vehicle, according to an exemplary embodiment.

FIG. 14 is a diagram showing a screen displaying an image corresponding to the accident information of another vehicle, according to an exemplary embodiment.

As shown in FIG. 14, the information providing vehicle 100 may display the accident information of the other vehicle 200 on the transparent display 121. That is, the information providing vehicle 100 may display a message 1410 such as "there is a three-car rear-end accident 1 km ahead, about 30 minutes to destination" or an image on the transparent display 121. Here, the information providing vehicle 100 may mark the location where the accident occurred by using an arrow, and may display the traffic lane (for example, a second lane) where the accident occurred.

Therefore, according to the present exemplary embodiment, the driver may identify the accident information of the other vehicle 200 rapidly, and deal with the accident promptly. For example, the driver may search for a detour, or change to another traffic lane before reaching the accident location.

Figure 15:
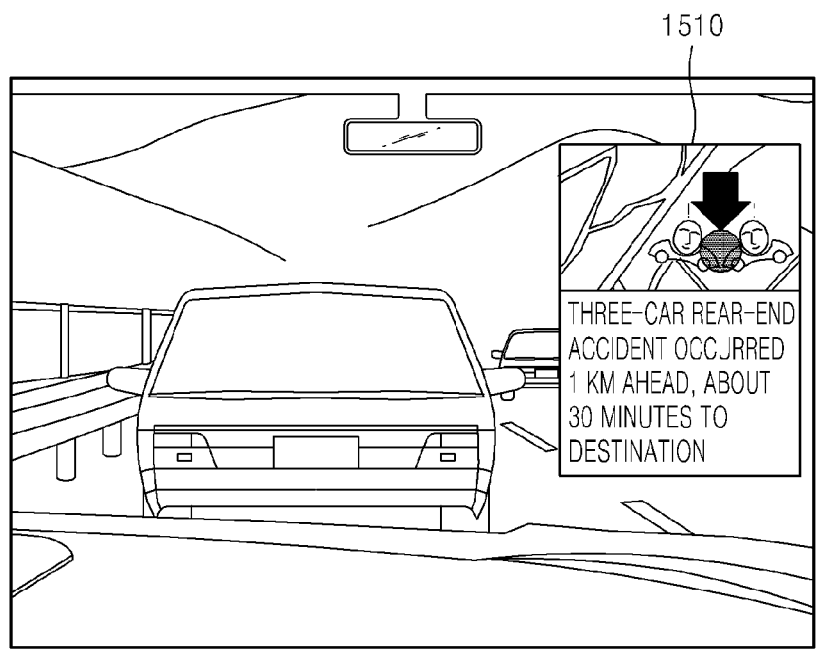
FIG. 15 is a diagram showing a screen mapping the accident information of the other vehicle to a map.

FIG. 15 is a diagram showing a screen mapping the accident information of the other vehicle 200 to a map.

As shown in FIG. 15, the information providing vehicle 100 may display the accident information of the other vehicle 200 (the location of the accident, the details of the accident, a time to the accident location, and the time when the accident occurred, etc.) (1510) after mapping the information to the map on the transparent display 121.

Here, according to the present exemplary embodiment, the information providing vehicle 100 may receive the accident information of the other vehicle 200 mapped to the map from the server 500.

Figure 16:
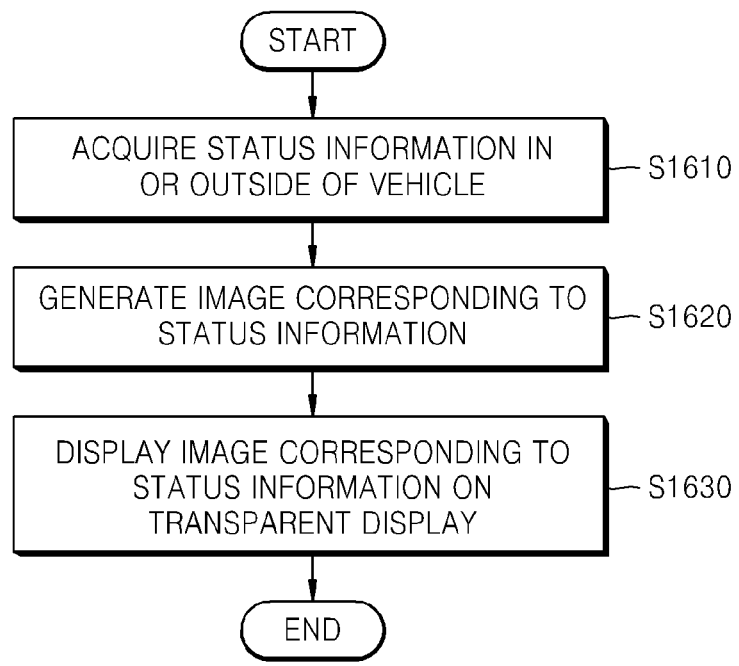
FIG. 16 is a flowchart illustrating an information providing method according to an exemplary embodiment.

FIG. 16 is a flowchart illustrating an information providing method according to an exemplary embodiment.

As shown in FIG. 16, the information providing vehicle 100 may acquire status information in or outside the information providing vehicle 100 (S1610).

For example, the information providing vehicle 100 may acquire the status information in the vehicle, for example, fuel status information, engine status information, tire information, location information of the information providing vehicle 100, driving speed information, driving direction information, turning light status information, temperature information, humidity information, and information about the driver (location of the drivers' eyes, drowsiness information, and alcohol level information).

Also, the information providing vehicle 100 may acquire the status information outside the vehicle 100, for example, background information about objects or geographical features outside the vehicle, illuminance information, accident information of the other vehicle 200, traffic status information, destination information, and information about an external vehicle having a cross-certificate for exchanging the location information with the information providing vehicle 100.

Here, according to the present exemplary embodiment, the information providing vehicle 100 may receive the status information outside the vehicle 100 from the other vehicle 200, the mobile terminal 300, the base station 400, or the server 500.

The information providing vehicle 100 may generate an image corresponding to the status information based on the acquired status information (S1620).

That is, the information providing vehicle 100 may analyze the acquired status information. For example, the information providing vehicle 100 may determine whether remaining fuel is less than a predetermined level based on the fuel status information, and may determine whether there is a defect in the vehicle and may detect a defective location in the vehicle based on the engine status information and the tire status information.

Here, the information providing vehicle 100 may generate an image corresponding to the status information based on a result of analyzing the acquired status information. For example, if it is determined that the vehicle 100 lacks fuel as a result of the analyzing, the information providing vehicle 100 may generate an image corresponding to gas station information (location of the gas station, price, etc.).

Also, when receiving information about the destination from the driver, the information providing vehicle 100 may generate an image corresponding to the destination guide information (route, traffic lanes, the speed limit, etc.).

According to the present exemplary embodiment, the information providing vehicle 100 may display the image corresponding to the status information on the transparent display 121 of the information providing vehicle 100 (S1630).

Therefore, the driver may identify the status information in the vehicle or the statue information outside of the vehicle while observing a real view through the transparent display 121. Therefore, according to the present exemplary embodiment, distraction of the driver's eyes during driving may be prevented, and the driver may recognize rapidly and easily the status information in or outside the vehicle.

According to the present exemplary embodiment, the information providing vehicle 100 may adjust a location or an angle of displaying the image corresponding to the status information in or outside the vehicle 100 on the transparent display 121, based on the location of the driver's eyes.

For example, when the information providing vehicle 100 displays an identification mark of a certain building that is observed by the driver on the transparent display 121, the information providing vehicle 100 may adjust the location or angle of the identification mark in consideration of the location of the driver's eyes, so that the driver may recognize that the identification mark precisely overlaps with the certain building.

In addition, the information providing vehicle 100 may adjust a size, a displaying interval, and a color of the image corresponding to the status information in or outside the vehicle, based on the driving speed of the information providing vehicle 100.

For example, the information providing vehicle 100 may increase the size of the image corresponding to the status information, may reduce the display interval, or may change the color of the image from blue to red, when the driving speed of the information providing vehicle 100 increases.

The information providing vehicle 100 according to the present exemplary embodiment may display the image corresponding to the status information inside or outside the vehicle 100 in the augmented reality mode. Also, the information providing vehicle 100 may display the status information about environmental conditions inside or outside of the vehicle 100 on the transparent display 121 after mapping the status information to a map.

The information providing vehicle 100 according to the present exemplary embodiment may adjust transparency of the transparent display 121 according to illuminance information outside the vehicle 100. For example, when the illuminance outside the vehicle 100 is high due to sunlight or headlights of a vehicle in front, the information providing vehicle 100 lowers the transparency of part or all of the transparent display. In addition, when the illuminance is low, the information providing vehicle 100 improves the transparency of the transparent display 121 so that the user may observe the outside of the vehicle 100.

In addition, the information providing vehicle 100 may acquire illuminance information according to the orientation of the driver's eyes. The information providing vehicle 100 may acquire the illuminance information according to the orientation of the driver's eyes in consideration of the driving direction, and location of the sun at the current time.

For example, if the driver drives while facing the sun, the information providing vehicle 100 may reduce the transparency of the transparent display 121.

The information providing vehicle 100 according to the present exemplary embodiment may set a partial or an entire region of the transparent display 121 to be opaque, based on the background information outside the vehicle 100.

Hereinafter, a method of providing information that may not be observed directly by the driver through the transparent display 121 will be described with reference to FIGS. 17 through 19.

Figure 17:
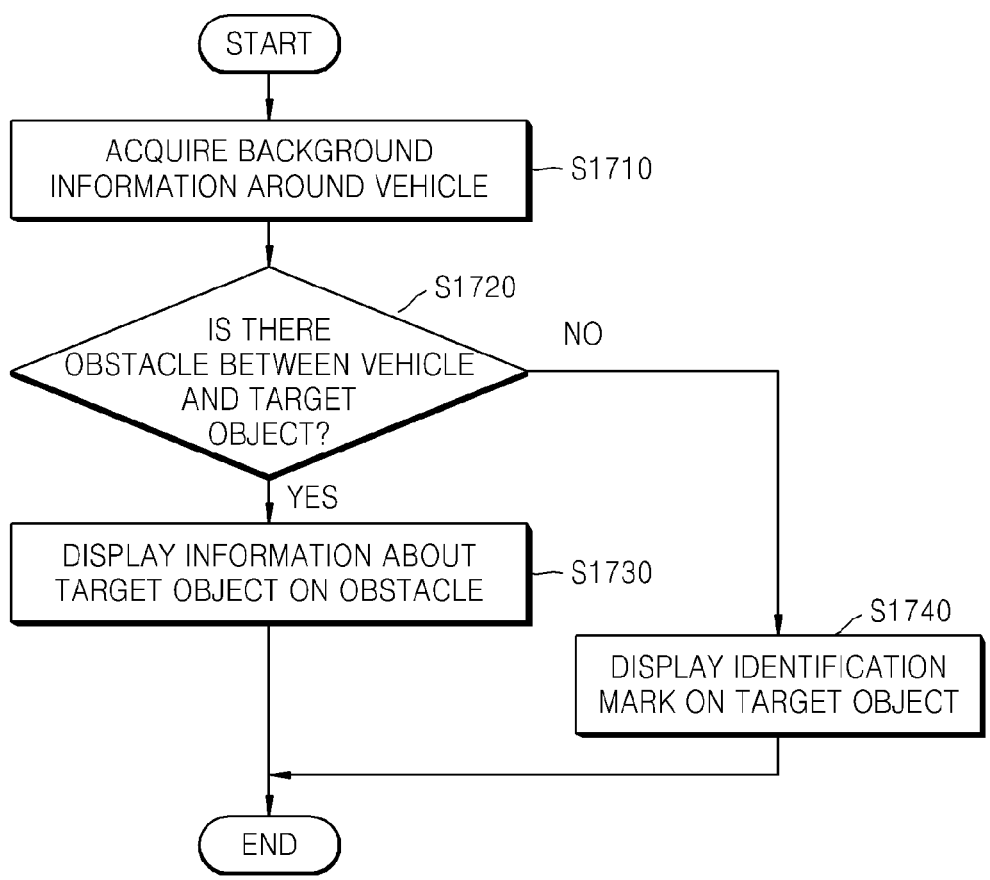
FIG. 17 is a flowchart illustrating a method of providing information about something that is invisible to the driver through the transparent display, according to an exemplary embodiment.

FIG. 17 is a flowchart illustrating a method of providing information about something that is invisible to the driver through the transparent display 121, according to an exemplary embodiment.

As shown in FIG. 17, the information providing vehicle 100 may acquire background information about an environment around the vehicle 100 (S1710). For example, the information providing vehicle 100 may acquire information about buildings, other vehicles, roadside trees, street lamps, traffic lanes, and geographical features that are located within a predetermined distance from the vehicle 100.

Here, according to the present exemplary embodiment, the information providing vehicle 100 may acquire the background information by using a vision technology. The information providing vehicle 100 photographs the road by using the camera, and may extract features such as traffic lines on the road, road signs, other vehicles, and pedestrians by using an edge detection method, a frequency based detection method, or a template based detection method. For example, the information providing vehicle 100 may recognize the other vehicle 200 by using features such as a car having a symmetric feature, a shadow zone being formed under the car, a rear portion of the car being generally square-shaped, and there being a lot of edges.

Also, the information providing vehicle 100 may define templates in advance based on the number plates, rear windows, and headlights seen at night, and may compare the image taken by the camera with the templates that are defined in advance to recognize the other vehicle 200.

In addition, the information providing vehicle 100 may recognize peripheral objects by using a stereo vision method which configures 3D information about the driving environment in front of the vehicle 100 or a motion analyzing method using an image sequence.

The information providing vehicle 100 may determine whether there is an obstacle between the information providing vehicle 100 and a target object (S1720). The target object may denote a building at the destination set by the driver, a destination location, a route to the destination, or a point of interest (POI) (for example, a gas station or a car repair shop).

The obstacle denotes an object that is located between the information providing vehicle 100 and the target object, which interferes with the driver observing the target object with his or her naked eyes through the transparent display 121. For example, the obstacle may denote a building, the other vehicle, or a mountain. The obstacle according to the present exemplary embodiment may be extracted from the background information around the vehicle, which is obtained by using the camera.

The information providing vehicle 100 may recognize a location of the obstacle by using the GPS information of the vehicle 100, the GPS information of the target object, the map information, or the compass information. Also, the information providing vehicle 100 may recognize the kind or shape of the obstacle by using the vision technology.

When recognizing the obstacle, the information providing vehicle 100 may display the information about the target object on the obstacle (S1730). That is, the information providing vehicle 100 may display the information about the target object on the transparent display 121 in the augmented reality mode.

If there is no obstacle, the information providing vehicle 100 may display the identification mark of the target object that is recognized by the front camera or the black box camera on the transparent display 121 in the augmented reality mode (S1740).

Figure 18:
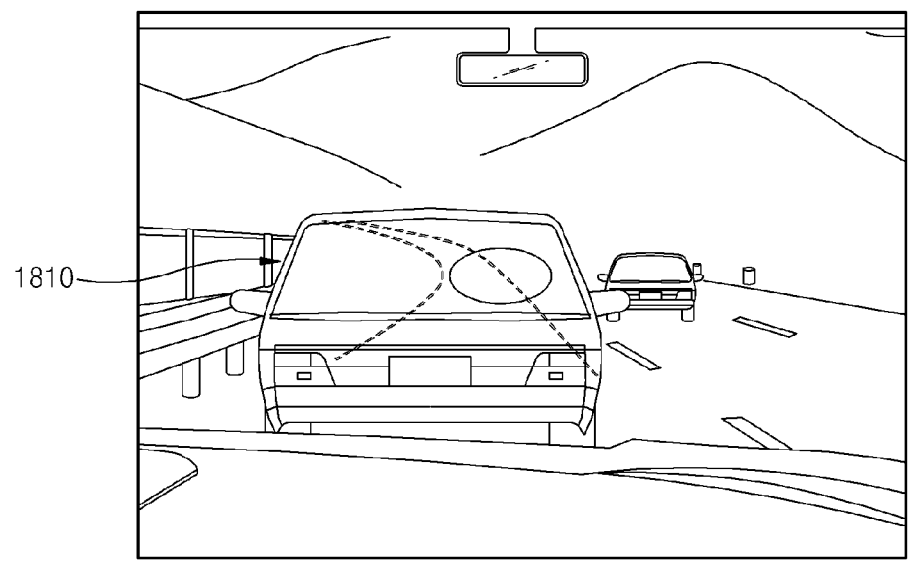
FIGS. 18 and 19 are diagrams showing a screen displaying road information on an obstacle, according to an exemplary embodiment.
Figure 19:
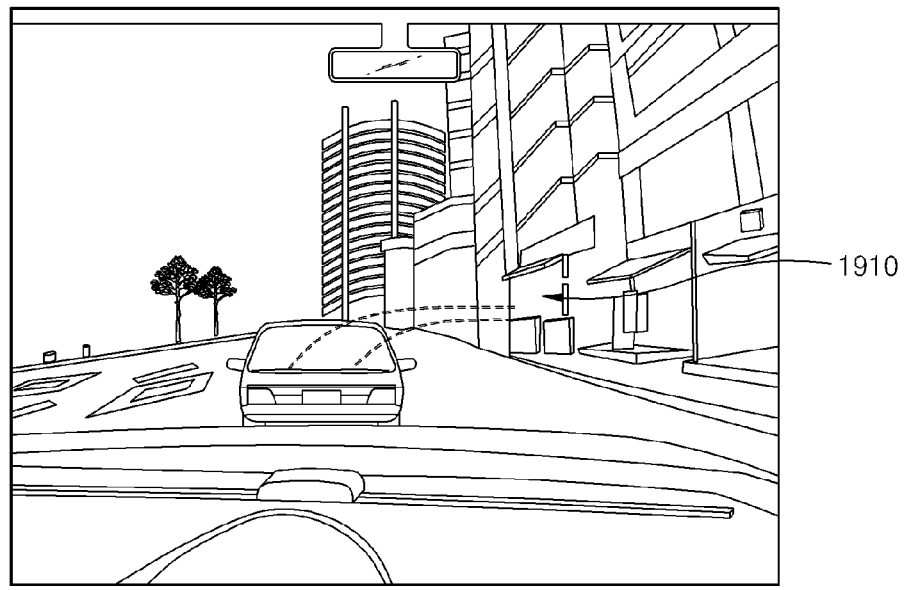

FIGS. 18 and 19 are diagrams showing a screen of displaying road information on an obstacle according to an exemplary embodiment.

As shown in FIG. 18, when a destination route is hidden by a vehicle in front of the information providing vehicle 100, the information providing vehicle 100 may display the destination route 1810 on the front vehicle through the transparent display 121. That is, the information providing vehicle 100 displays the destination route 1810 that may not be directly checked by the driver due to the front vehicle on the transparent display 121 so that the driver may identify the destination route 1810 easily.

If the destination route 1810 may interfere with the driving or the view of the driver, the information providing vehicle 100 may display the destination route 1810 on the transparent display 121 as dotted lines or a semi-transparent status, or may flash the destination route 1810 at predetermined intervals.

As shown in FIG. 19, if there is a right-turn road 1910 behind the obstacle, the information providing vehicle 100 may denote the right-turn road 1910 on the transparent display 121 as dotted lines.

Hereinafter, the method of providing information corresponding to each status occurring in or outside the vehicle will be described.

FIG. 20 is a flowchart illustrating a method of providing information about a gas station, according to an exemplary embodiment.

In operation S2010, the information providing vehicle 100 may acquire fuel status information in the vehicle 100. According to the present exemplary embodiment, the information providing vehicle 100 may acquire the fuel status information at regular intervals.

In operation S2020, the information providing vehicle 100 may analyze the fuel status information to determine whether remaining fuel is less than a predetermined level.

In operation S2030, if the remaining fuel is equal to or less than a predetermined level, the information providing vehicle 100 may search for gas stations that the vehicle 100 may reach with the remaining fuel. That is, the information providing vehicle 100 searches for the gas stations that the vehicle 100 may reach with the remaining fuel, based on fuel efficiency information and the fuel status information.

According to the present exemplary embodiment, the information providing vehicle 100 may receive information about gas stations located within a predetermined distance, from the base station 400. Otherwise, the information providing vehicle 100 may transmit the fuel status information and the current location information to the server 500, and may receive the information about the gas stations that the vehicle 100 may reach with the remaining fuel.

In operation S2040, the information providing vehicle 100 may display the information about the gas stations on the transparent display 121. The information about the gas station may include a location of the gas station, a distance to the gas station, a sign of the gas station, price of the fuel used in the information providing vehicle 100, a route to enter the gas station, and telephone number of the gas station.

FIG. 21 is a diagram showing a screen displaying information about a gas station located at distance from the driver that makes it invisible to him or her, according to an exemplary embodiment.

As shown in FIG. 21, if a found gas station AAA is located 1.5 km ahead and the driver may not see the gas station AAA directly through the front window due to the vehicles ahead, the information providing vehicle 100 may display the information about the gas station AAA (2110) on the transparent display 121 in the augmented reality mode.

If the information providing vehicle 100 uses diesel fuel, the information providing vehicle 100 may display the price of the diesel fuel in the gas station AAA (₩ 1800 or $0.00) on the transparent display 121.

Figure 22A:
FIGS. 22A and 22B are diagrams showing information about an essential gas station.
Figure 22B:
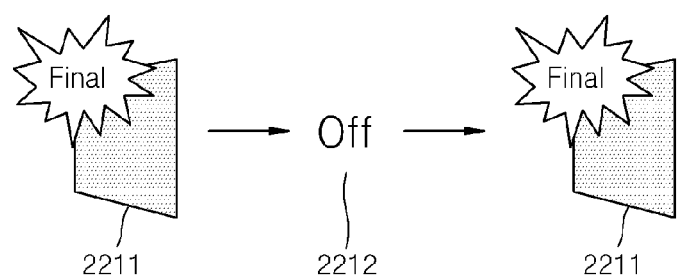

FIGS. 22A and 22B are diagrams showing information about an essential gas station.

The essential gas station is a gas station where the information providing vehicle 100 has to stop according the amount of remaining fuel. For example, it is assumed that the information providing vehicle 100 may only travel 2 km with the remaining fuel as a result of a calculation based on the fuel efficiency information and the fuel status information of the information providing vehicle 100. Here, when the gas station AAA is located 0.5 km ahead and a next gas station, that is, a gas station BBB, is located 3 km ahead, the information providing vehicle 100 may display that the gas station AAA is the last gas station that the information providing vehicle 100 may reach with the remaining fuel on the transparent display 121.

In addition, as shown in FIG. 22A, in a case where the driver directly observes the gas station, the information providing vehicle 100 may display an identification mark 2210 on the essential gas station through the transparent display 121. The identification mark 2210 of the essential gas station is a sign for distinguishing the essential gas station from other objects.

Also, as shown in FIG. 22B, the information providing vehicle 100 may display the identification mark 2210 of the essential gas station on the transparent display 121 at predetermined intervals. Here, the information providing vehicle 100 may adjust the interval of displaying the identification mark 2210 according to the driving speed or the distance to the essential gas station. For example, if the driving speed is high or the distance to the gas station is reduced, the information providing vehicle 100 may flash the identification mark 2210 quickly.

Figure 23:
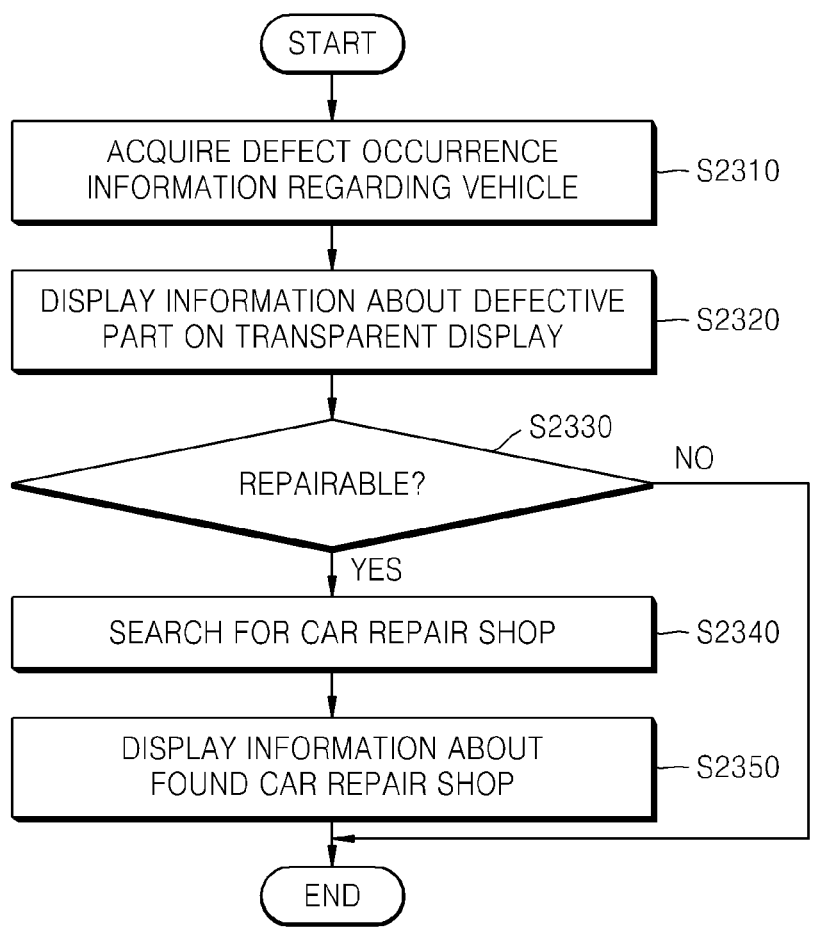
FIG. 23 is a flowchart illustrating a method of providing an image corresponding to defect information regarding the vehicle, according to an exemplary embodiment.

FIG. 23 is a flowchart illustrating a method of providing an image corresponding to defect information regarding the vehicle 100, according to an exemplary embodiment.

In operation S2310, the information providing vehicle 100 may acquire defect occurrence information regarding the vehicle 100. For example, the information providing vehicle 100 may acquire defect information regarding the vehicle such as that the tire is worn away more than a critical value, pneumatic pressure in the tire is less than a critical level, the engine oil is lower than a critical level, or the brake does not operate optimally, based on the engine status information and the tire information.

In operation S2320, the information providing vehicle 100 may display information about the defect occurrence on the transparent display 121. For example, if the pneumatic pressure in the tire is less than the critical value, the information providing vehicle 100 may display an image of tire on the transparent display 121.

In operation S2330, the information providing vehicle 100 may determine whether a defective part may be repaired. In operation S2340, if the defective part is repairable, the information providing vehicle 100 may search for a car repair shop. For example, if the degree of abrasion of the tire is equal to or greater than the critical value, the information providing vehicle 100 may search for a tire shop.

According to the present exemplary embodiment, the information providing vehicle 100 transmits information about the defective part and location information thereof to the base station 400 or the server 500, and then, may receive information about a found car repair shop from the base station 400 or the server 500.

In operation S2350, the information providing vehicle 100 may display information about the found car repair shop. The information about the found car repair shop may include identification information (name), location information of the found car repair shop, repair estimation, phone number of the found car repair shop, and a route to enter the car repair shop. This will be described in detail with reference to FIGS. 24 and 25.

Figure 24:
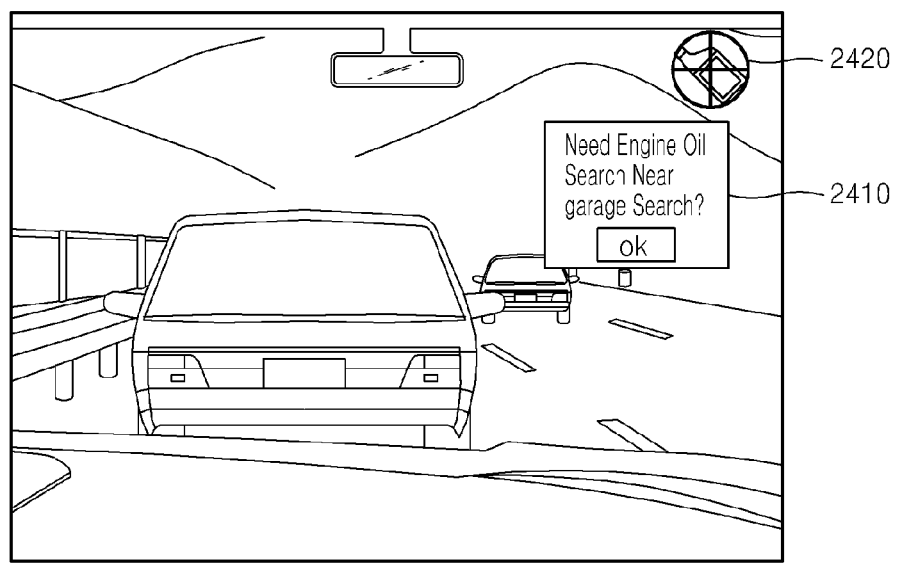
FIG. 24 is a diagram showing a screen displaying information about a defective part of the vehicle, according to an exemplary embodiment.

FIG. 24 is a diagram showing a screen displaying information about the defective part in the vehicle 100, according to an exemplary embodiment.

As shown in FIG. 24, if the engine oil is equal to or less than a critical level, the information providing vehicle 100 may display a warning message 2410 or a warning image 2420 on the transparent display 121. In addition, when a search request of the car repair shop is input from the driver (or the passenger), the information providing vehicle 100 may search for car repair shops located within a predetermined distance from the current location.

Figure 25:
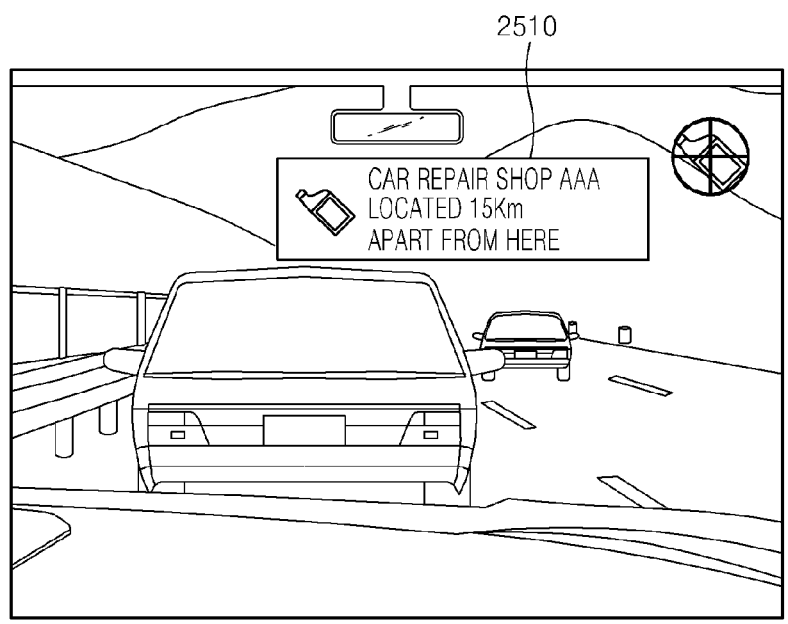
FIG. 25 is a diagram showing a screen displaying information about a car repair shop, according to an exemplary embodiment.

FIG. 25 is a diagram showing a screen displaying information about the car repair shop according to an exemplary embodiment.

As shown in FIG. 25, when a car repair shop is found, the information providing vehicle 100 may display information about the car repair shop (for example, a message read as "Car repair shop AAA located 15 km apart from here") 2510 on the transparent display 121. Also, the information providing vehicle 100 may further display price information of engine oil replacement in the car repair shop AAA on the transparent display 121.

In addition, if the found car repair shop is recognized by the front camera or the black box camera (that is, if the driver may observe the found car repair shop through the front window or the transparent display 121), the information providing vehicle 100 may display an identification mark of the car repair shop on the transparent display 121.

The above exemplary embodiments may be implemented in the form of executable program commands through a variety of computer means and recorded on computer readable media. The computer readable media may include solely or in combination, program commands, data files and data structures. The program commands recorded on the media may be components specially designed for the present exemplary embodiment or may be usable by one of ordinary skill in the art of computer software. Computer readable recording media include magnetic media such as a hard disk, a floppy disk, and a magnetic tape, optical media such as a CD-ROM and a DVD, magneto-optical media such as a floppy disk and hardware devices such as ROM, RAM and flash memory specially designed to store and carry out programs. Program commands include not only machine language code generated by a complier but also high level code that can be used by an interpreter etc., which is executed by a computer.

While the application has been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A method of providing information about an external vehicle on a transparent display of a vehicle, the method comprising:
   receiving status information of the external vehicle from the external vehicle;
   determining a distance between the vehicle and the external vehicle based on the status information of the external vehicle; and
   selectively operating the transparent display in one of an augmented reality mode and a map mode for displaying an object corresponding to the external vehicle on the transparent display based on the determined distance between the vehicle and the external vehicle;
   wherein
   the transparent display operates in the map mode for displaying an object corresponding to the external vehicle on a map image according to the determined distance being greater than or equal to a predetermined distance, or operates
   in the augmented reality mode for displaying an object corresponding to the external vehicle to overlap with the external vehicle according to the determined distance being less than the predetermined distance; and
   wherein the object is displayed according to the transparent display operating the map mode or the augmented reality mode.

2. The method of claim 1, wherein the status information of the external vehicle comprises at least one of location information of the external vehicle, route information, driving speed information, stoppage status information, used traffic lane information, and turning light manipulation status information.

3. The method of claim 1, wherein the receiving the status information of the external vehicle comprises receiving the status information from the external vehicle via a predetermined network.

4. The method of claim 1, wherein the predetermined distance comprises a visible distance, in which a driver of the vehicle may see the external vehicle with his or her naked eyes.

5. The method of claim 1,
when the transparent display operates in the augmented reality mode, the method further comprising:
recognizing the external vehicle by using a camera based on at least one of outer appearance information and plate number information of the external vehicle; and
displaying the object corresponding to the external vehicle on the transparent display so that the object corresponding to the external vehicle may overlap the actual image of the external vehicle.

6. The method of claim 5, wherein the recognizing of the external vehicle comprises:
selecting a plurality of candidate vehicles that are recognized through the camera based on at least one of the outer appearance information and the plate number information; and
recognizing the external vehicle from among the plurality of candidate vehicles based on eye information of a driver or input information of the driver.

7. The method of claim 1, wherein the transparent display operates for displaying at least one of route information, driving speed information, stoppage status information, used traffic lane information, and turning light manipulation status information of the external vehicle.

8. The method of claim 1, wherein the transparent display operates for displaying the object corresponding to the external vehicle on the transparent display after mapping the object to the map, when the map mode is selected as a display mode.

9. The method of claim 8, wherein the transparent display operates changing a scale of the map based on the distance between the vehicle and the external vehicle after the mapping of the object.

10. The method of claim 1, wherein transparent display operates
for recognizing a location of a driver's eyes, and
for adjusting a display location or an angle of the object corresponding to the external vehicle, based on the location of the driver's eyes.

11. The method of claim 1, wherein the external vehicle comprises a vehicle having a cross-certificate for exchanging location information with the vehicle.

12. The method of claim 1, further comprising:
receiving identification information of the external vehicle;
requesting the external vehicle to exchange location information based on the identification information of the external vehicle; and
receiving an acceptance message with respect to the request for exchanging the location information from the external vehicle.

13. The method of claim 1, further comprising acquiring illuminance information outside the vehicle or illuminance information according to a direction of eyes of a driver of the vehicle.

14. The method of claim 13, further comprising adjusting transparency of the transparent display based on the illuminance information outside the vehicle or the illuminance information according to the direction of the driver's eyes.

15. The method of claim 13, further comprising changing a color of the object corresponding to the external vehicle and displaying the object, based on the illuminance information outside the vehicle or the illuminance information according to the direction of the driver's eyes.

16. The method of claim 1, further comprising receiving and displaying information provided by a navigation device of the external vehicle from the external vehicle.

17. The method of claim 1, further comprising:
when a remaining fuel level is equal to or less than a predetermined fuel level, searching for a gas station that the vehicle may reach with the remaining fuel,
displaying information about the searched gas station on the transparent display.

18. The method of claim 17, wherein the displaying of the information about the searched gas station comprises displaying an object corresponding to the searched gas station and overlapping the object with an actual image of the found gas station, when the found gas station is recognized by a camera.

19. The method of claim 1, further comprising:
acquiring defect occurrence information regarding the vehicle;
searching for a car repair shop where a defective part of the may be repaired, based on the defect occurrence information; and
displaying information about a found car repair shop on the transparent display.

20. The method of claim 1, further comprising displaying an image corresponding to at least one of information about a location where an accident occurs, accident occurring time information, accident occurring traffic lane information, and detour information on the transparent display.

21. A computer-readable recording medium having embodied thereon a program for executing the information providing method of claim 1.

22. The method of claim 1, wherein the status information of the external vehicle comprises status information of the external vehicle relative to the vehicle.

23. The method of claim 22, wherein the status information of the external vehicle comprises at least one of relative speed of the external vehicle with respect to the vehicle, relative location information of the external vehicle, and relative distance information from the vehicle.

24. An apparatus for providing information about an external vehicle on a transparent display, the apparatus comprising:
a communication device configured to receive status information of the external vehicle from the external vehicle;
a controller configured to determine a distance between the vehicle and the external vehicle based on the status information of the external vehicle; and
a transparent display configured to display an object corresponding to the external vehicle in one of an augmented reality mode and a map mode based on the determined distance between the vehicle and the external vehicle;
wherein the controller is configured to control the transparent display to operate in the map mode for displaying an object corresponding to the external vehicle on a map image, according to the determined distance being greater than or equal to a predetermined distance, and is configured to operate in the augmented reality mode for displaying the object corresponding to the external vehicle to overlap with the external vehicle according to the distance being less than the predetermined distance,
wherein the object is displayed according to the transparent display operating the map mode or the augmented reality mode.

25. The apparatus of claim 24, wherein the controller is configured to determine the augmented reality mode as a display mode when the distance between the vehicle and the external vehicle is less than a predetermined distance, and is configured to determine the map mode as a display mode when the distance between the vehicle and the external vehicle is equal to or greater than the predetermined distance.

26. The apparatus of claim 25, wherein the predetermined distance comprises a visible distance, in which a driver of the vehicle sees the external vehicle with his or her naked eyes, and the controller is configured to adjust the visible distance based on at least one of weather information, illuminance information, and humidity information.

27. The apparatus of claim 24, wherein the controller is configured to recognize the external vehicle through a camera based on at least one of outer appearance information of the external vehicle and plate number information of the external vehicle, when the augmented reality mode is selected as a display mode, and the transparent display is configured to display the object corresponding to the external vehicle and overlaps the object with an actual image of the external vehicle.

28. The apparatus of claim 27, wherein the controller is configured to select a plurality of candidate vehicles that are recognized through the camera based on at least one of the outer appearance information and the plate number information; and recognize the external vehicle from among the plurality of candidate vehicles based on eye information of a driver or input information of the driver.

29. The apparatus of claim 24, wherein the transparent display is configured to display at least one of route information, driving speed information, stoppage status information, used traffic lane information, and turning light manipulation status information of the external vehicle.

30. The apparatus of claim 24, wherein the transparent display is configured to display the object corresponding to the external vehicle on the transparent display after mapping the object to the map, when the map mode is selected as a display mode.

31. The apparatus of claim 30, wherein the controller is configured to change a scale of the map based on the distance between the vehicle and the external vehicle.

32. The apparatus of claim 24, wherein the controller is configured to recognize a location of a driver's eyes, and adjust a display location or an angle of the object corresponding to the external vehicle, based on the location of the driver's eyes.

33. The apparatus of claim 24, wherein the apparatus further comprises:
a user input configured to receive identification information of the external vehicle from a driver; and
wherein the communication device is further configured to request the external vehicle to exchange location information with the vehicle, and receive an acceptance message with respect to the request for exchanging the location information from the external vehicle.

34. The apparatus of claim 24, wherein the controller is configured to acquire illuminance information outside the vehicle or illuminance information according to a direction of a driver's eyes.

35. The apparatus of claim 34, wherein the controller is configured to adjust transparency of the transparent display based on the illuminance information outside the vehicle or the illuminance information according to the direction of a driver's eyes.

36. The apparatus of claim 34, wherein the transparent display is configured to change a color of the object corresponding to the external vehicle and display the object, based on the illuminance information outside the vehicle or the illuminance information according to the direction of a driver's eyes.

37. The apparatus of claim 24, wherein the transparent display is configured to receive and display information provided by a navigation device of the external vehicle from the external vehicle.

38. The apparatus of claim 24, wherein, when a remaining fuel level is equal to or less than a predetermined level, the controller searches for a gas station that the vehicle may reach with the remaining fuel, and the transparent display displays information about the searched gas station.

39. The apparatus of claim 38, wherein the transparent display is configured to display an object corresponding to the searched gas station and overlap the object with an actual image of the searched gas station, when the searched gas station is recognized by a camera.

40. The apparatus of claim 24, wherein the controller is further configured to acquire defect occurrence information of the vehicle, search for a car repair shop in which a defective part may be repaired, based on the defect occurrence information, and control the transparent display to display information about a found car repair shop.

41. The apparatus of claim 24, wherein the transparent display is configured to display an image corresponding to at least one of information about a location where an accident occurs, accident occurring time information, accident occurring traffic lane information, and detour information on the transparent display.

* * * * *